United States Patent
Peterson

(10) Patent No.: US 10,864,970 B2
(45) Date of Patent: Dec. 15, 2020

(54) CONNECTOR SYSTEMS AND METHODS FOR CONNECTING SECTIONS OF PRODUCTS AND PRODUCTS USING SUCH SYSTEMS AND METHODS

(71) Applicant: Marko Foam Products, Inc., Huntington Beach, CA (US)

(72) Inventor: Tyson James Peterson, Newport Beach, CA (US)

(73) Assignee: Marko Foam Products, Inc., Huntington Beach, CA (US)

( * ) Notice: Subject to any disclaimer, the term of this patent is extended or adjusted under 35 U.S.C. 154(b) by 0 days.

(21) Appl. No.: 16/505,513

(22) Filed: Jul. 8, 2019

(65) Prior Publication Data

US 2020/0010157 A1   Jan. 9, 2020

Related U.S. Application Data

(60) Provisional application No. 62/695,425, filed on Jul. 9, 2018.

(51) Int. Cl.
   *B63B 32/53*   (2020.01)
   *F16B 7/04*    (2006.01)
   *B63B 32/70*   (2020.01)

(52) U.S. Cl.
   CPC .............. *B63B 32/53* (2020.02); *B63B 32/70* (2020.02); *F16B 7/0406* (2013.01)

(58) Field of Classification Search
   CPC ......... B63B 32/53; B63B 32/70; B63B 32/77; F16B 7/0406
   See application file for complete search history.

(56) References Cited

U.S. PATENT DOCUMENTS

| | | | |
|---|---|---|---|
| 337,867 A | 3/1886 | Richards | |
| 1,589,469 A * | 6/1926 | Homand | F16L 37/248 |
| | | | 285/100 |
| 3,137,872 A | 6/1964 | Edwards et al. | |
| 3,649,052 A | 3/1972 | Snyder, Jr. | |
| 3,747,964 A | 7/1973 | Nilsen, Jr. | |
| 5,667,251 A | 9/1997 | Prest | |
| 5,711,692 A * | 1/1998 | Pope | B63B 32/53 |
| | | | 441/74 |
| 7,347,755 B1 | 3/2008 | Katzfey | |
| 8,469,756 B2 | 6/2013 | Becker | |
| 9,150,288 B2 | 10/2015 | Barr | |

FOREIGN PATENT DOCUMENTS

CH         107687         11/1924

\* cited by examiner

*Primary Examiner* — Stephen P Avila
(74) *Attorney, Agent, or Firm* — Knobbe, Martens, Olson & Bear, LLP

(57) ABSTRACT

Connector systems for, for example, polymeric solid foam products and products using such systems are disclosed. The connector systems may comprise a pair of hollow coupling members embedded in adjacent foam bodies, such as sections of a surfboard or paddleboard. When axially aligned, the coupling members may be connected together by a connector member that extends into each coupling member. The coupling members have internal projections. The connector member has bent connector channels along which the projections can travel when the connector member is rotated about its axis and in so doing the foam bodies may be connected together or disconnected.

20 Claims, 22 Drawing Sheets

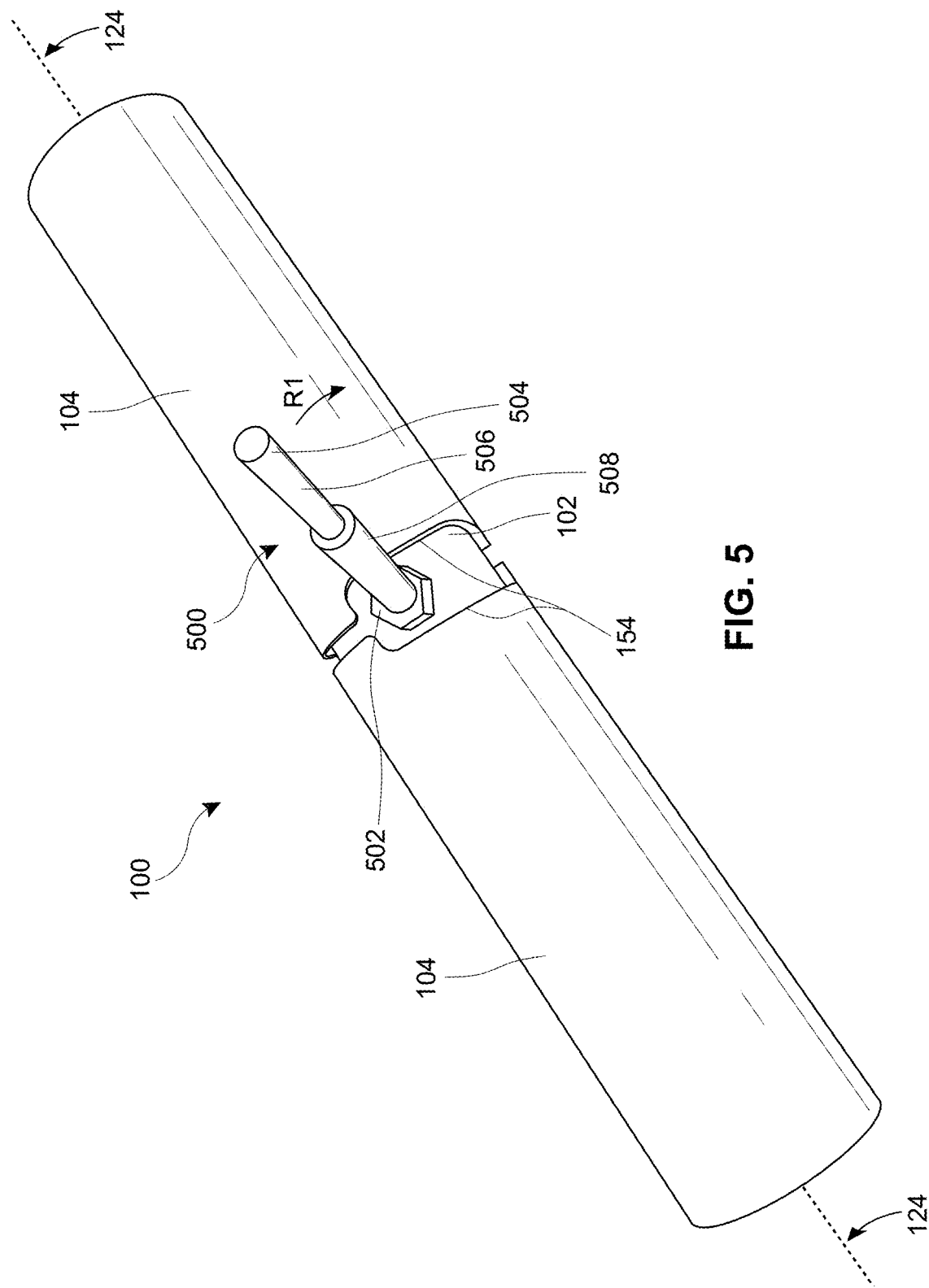

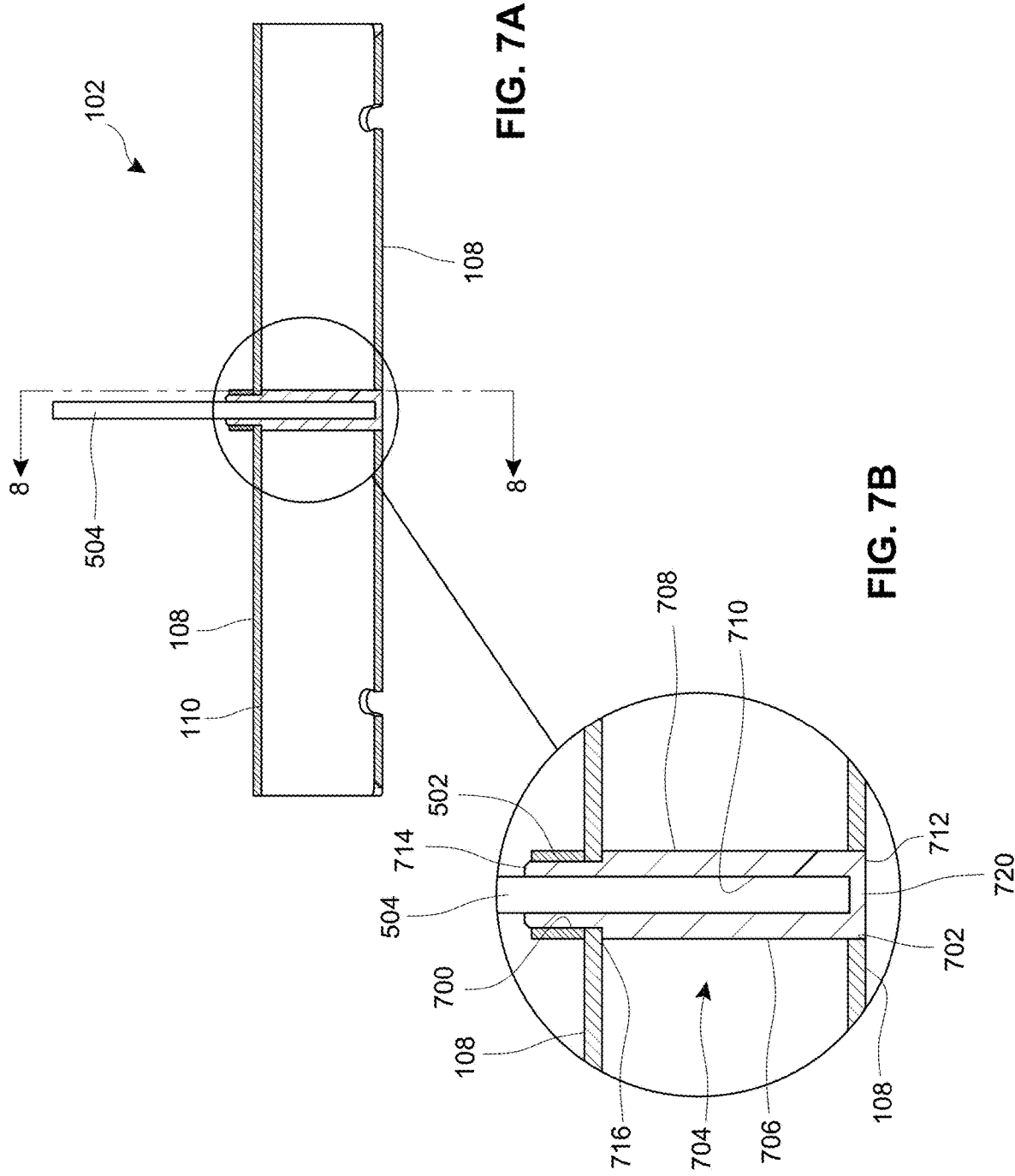

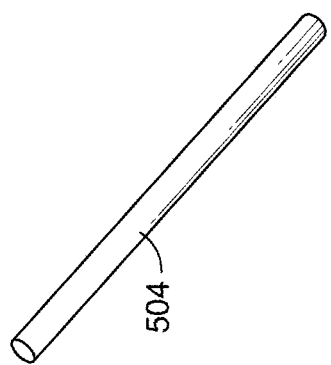
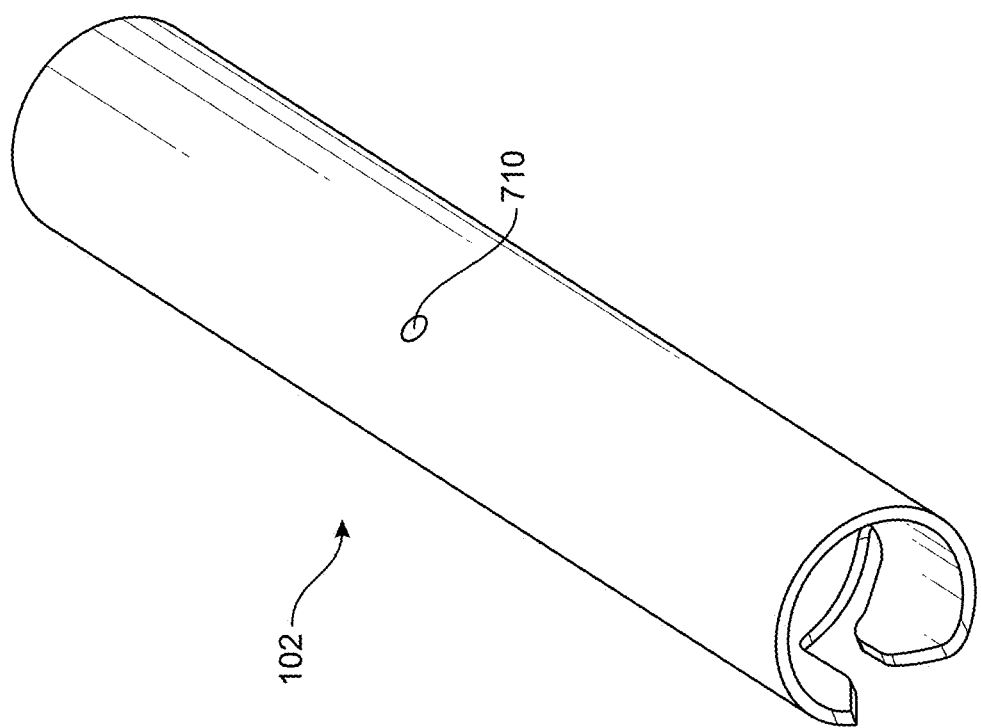
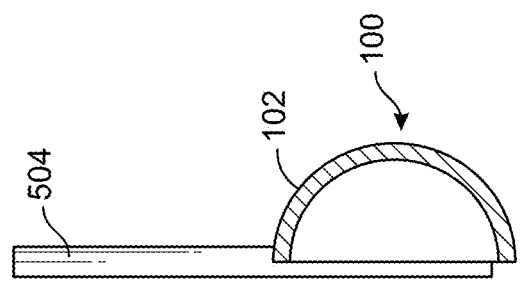
FIG. 8C
FIG. 8B
FIG. 8A

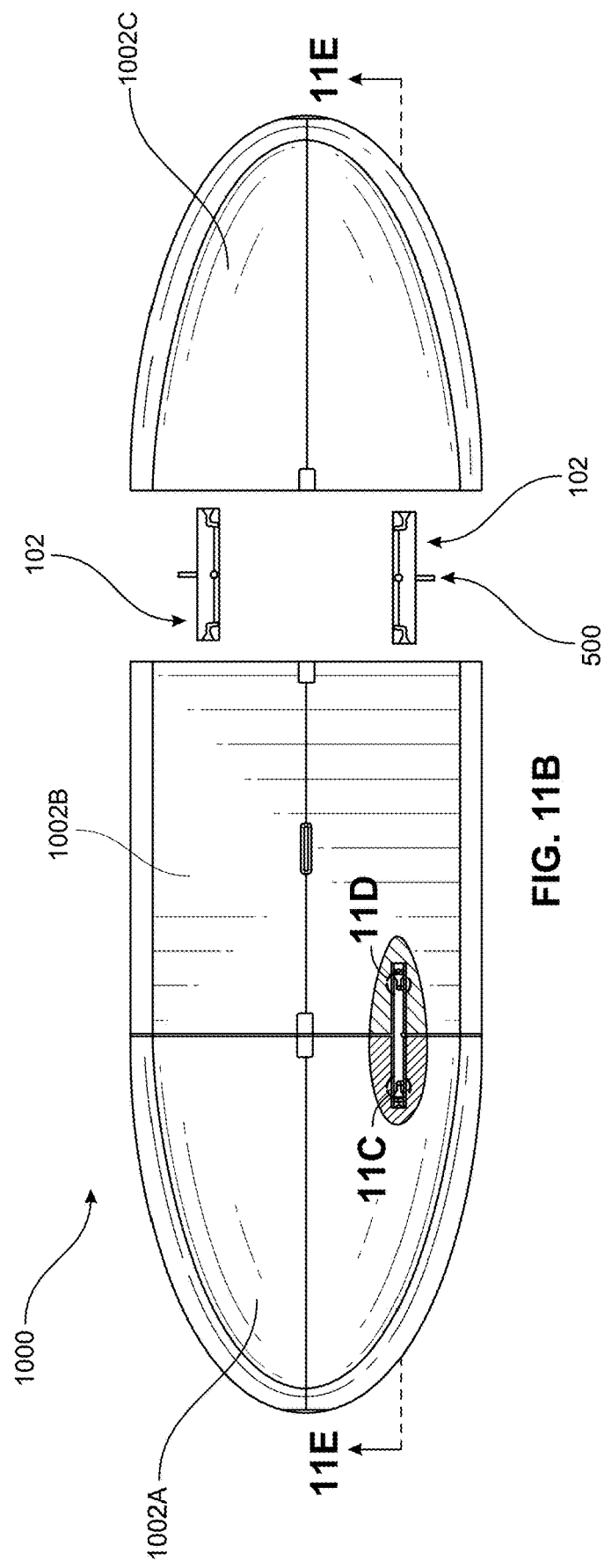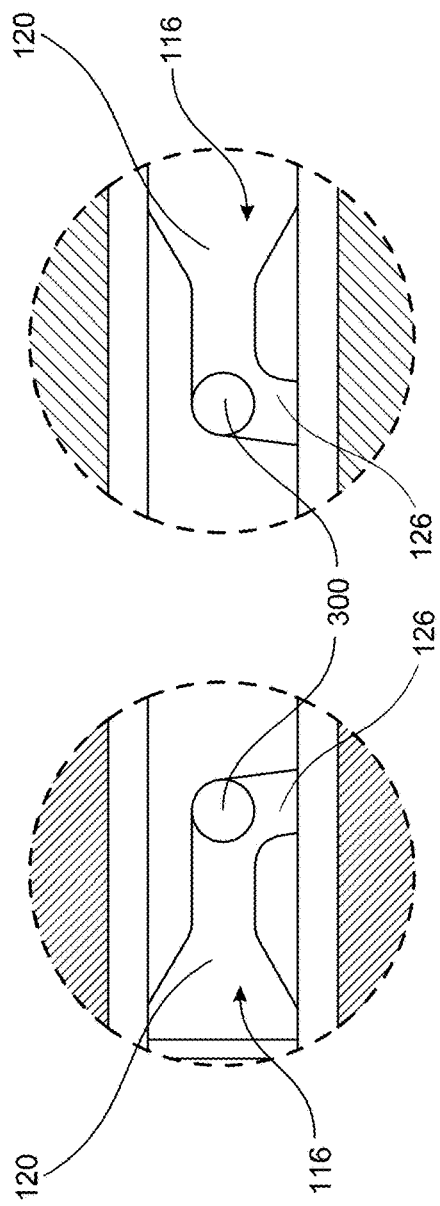

CONNECTOR SYSTEMS AND METHODS FOR CONNECTING SECTIONS OF PRODUCTS AND PRODUCTS USING SUCH SYSTEMS AND METHODS

CROSS REFERENCE TO RELATED APPLICATIONS

This application claims priority to U.S. Provisional Application No. 62/695,425 filed Jul. 9, 2018, titled CONNECTOR SYSTEMS FOR POLYMERIC FOAM PRODUCTS AND PRODUCTS USING SUCH SYSTEMS, the entirety of which is incorporated herein by reference.

BACKGROUND

Field

This disclosure relates to connector systems for solid foam products, for example synthetic polymeric foams and composite materials, and such products as surfboards and paddleboards using such connector systems.

Description of the Related Art

Solid foam products are generally low weight and are not easy to connect together, because of their relatively weak structure and the risk of damage to the products.

Mechanisms for connecting blocks of foam together may be liable to damage the foam products and/or poorly connect them, especially over a period of time.

In the leisure industry, surfing and paddle boarding have become more popular. Surfboards and paddle boards in particular and large and bulky and difficult to transport and store. Such boards have been made into smaller sections and then connected together for use. But typical connectors are not reliable and do not firmly and consistently hold the sections firmly together, particularly under the stress of use. Also, typical connectors can be awkward to use.

SUMMARY

This disclosure provides connector systems that may be used to connect together solid foam products, such as surfboards and paddle boards, in an easy and reliable manner. This disclosure is also applicable to other boards, such as body boards and other polymer foam products comprising sections that need to be held together.

Connector systems for polymeric solid foam products and products using such systems are disclosed. The connector systems may comprise a pair of hollow coupling members embedded in adjacent foam bodies, such as sections of a surfboard or paddleboard. When axially aligned, the coupling members may be connected together by a connector member that extends into each coupling member. The coupling members have internal projections. The connector member has bent connector channels along which the projections can travel when the connector member is rotated about its axis and in so doing the foam bodies may be connected together or disconnected.

According to an aspect, a water board with a connector system for holding together sections of the water board is disclosed. The water board can include a first section having a first surfaces extending between sides of the water board. The water board can include a second section having a second surface extending between sides of the water board. The water board can include a connector system that can connect the first and second sections by fixing the first surface to be adjacent the second surface. The connector system can include a generally cylindrical connector. The generally cylindrical connector can include a first end, a second end, and a connector wall having an inner surface and an outer surface. The inner surface of the generally cylindrical connector can have an inside diameter, and the outer surface of the generally cylindrical connector can have an outside diameter. The inside and outside diameters of the connector wall perpendicular to a longitudinal central axis can extend between the first and second ends. A first connector channel can be formed in the connector wall at the first end. A second connector channel can be formed in the connector wall at the first end. The connector system can also include a first generally cylindrical coupler can be embedded in the first section of the water board. The first generally cylindrical coupler can include a first coupler wall having an inner surface and an outer surface, where the inner surface of the first generally cylindrical coupler having an inside diameter, and the outer surface of the first generally cylindrical coupler having an outside diameter. The first coupler wall can form a first open end. The inside diameter of the first coupler wall can be greater than the outside diameter of the connector wall such that at least a portion of the connector wall at the first end of the generally cylindrical connector can be positioned into the first open end of the first generally cylindrical coupler. The first generally cylindrical coupler can also include a first coupling boss extending inwardly from the inner surface of the first generally cylindrical coupler. The first coupling boss can be engage with the first connector channel to fix the at least a portion of the connector wall at the first end within the first coupler wall with the first end of the generally cylindrical connector positioned into the first open end of the first generally cylindrical coupler. The connector system can also include a second generally cylindrical coupler embedded in the second section of the water board. The second generally cylindrical coupler can include a second coupler wall having an inner surface and an outer surface, where the inner surface of the second generally cylindrical coupler can have an inside diameter, and the outer surface of the second generally cylindrical coupler can have an outside diameter. The second coupler walls can form a second open end. The inside diameter of the second coupler wall can be greater than the outside diameter of the connector wall such that at least a portion of the connector wall at the second end of the generally cylindrical connector can be positioned into the second open end of the second generally cylindrical coupler. The second generally cylindrical coupler can also include a second coupling boss extending inwardly from the inner surface of the second generally cylindrical coupler. The second coupling boss can engage with the second connector channel to fix the at least a portion of the connector wall at the second end within the second coupler wall with the positioning of the second end of the generally cylindrical connector into the second open end of the second generally cylindrical coupler.

The generally cylindrical connector can further include an actuator rod that can rotate the generally cylindrical connector about the longitudinal central axis. The first and second generally cylindrical coupler can each include a recessed portion providing space between the first and second generally cylindrical coupler to allow the actuator rod to rotate relative to the longitudinal central axis.

The first and second connector channels can begin at the at the first and second ends, respectively, and can include a first portion extending partially along the connector member generally parallel to the longitudinal central axis and a second portion extending at an angle to the first portion. The angle can be greater than 90 degrees. The first portion can include an expanded section that is wider than a remainder of the first portion.

The connector channels can be generally L-shaped.

The first and second generally cylindrical couplers can each include a stabilizing member positioned opposite the first and second open ends. The stabilizing member can engage the first or second section of the water board to prevent rotation of the first or second generally cylindrical couplers relative to the first or second section of the water board. The stabilizing member can include at least one anchoring projection extending from the first or second coupler wall. The stabilizing member can include a flange including one or more openings. The flange can include an extent greater than the outside diameter of the first or second generally cylindrical coupler. The first or second section of the water board can be formed around the flange. The one or more openings can allow portions of the first or second section to extend through the flange to fix the flange relative to the first or second section.

According to another aspect, a connector system for connecting solid foam products together is disclosed. The connector system can include a connector member having first and second ends. The connector system can include first and second coupling members. The connector member can have walls forming a generally cylindrical connector body having and an inside and outside diameter and a longitudinal central axis. The coupling members can each have walls forming generally cylindrical coupling bodies each having at least one open end and an inside and outside diameter, where the walls can have an inner surface and an outer surface. An inside diameter of each coupling member body can be greater than an outside diameter of the connector member body, so that at least a portion of the first end of the connector member can be located into the open end of the first coupling member and at least a portion of the second end of the connector member can be located into the open end of the second coupling member. Each of the coupling members can have at least one coupling projection extending inwardly from its inner surface. The first end of the connector member can include a first connector channel through the wall of the connector member that is open at said first end. The second end of the connector member can have a second connector channel through the wall of the connector member that is open at said second end. When the at least a portion of the first end of the connector member is located into the open end of the first coupling member and the at least a portion of the second end of the connector member is located into the open end of the second coupling member, each a sufficient distance, the at least one coupling projection of each coupling member can engage with the respective one of the first and second connector channels. The connector channels can be configured such that rotation of the connector member about its axis permits the at least one coupling projection of each coupling member to travel along the respective connector channel to a position where the connector member cannot be withdrawn axially from either coupling member.

The connector system can also include an actuator member for causing the connector member to rotate about its axis.

The connector member can include a fitting that can receive an actuator member.

The connector channels can begin at the at the first and second ends and include a first portion extending partially along the connector member generally parallel to the axis and a second portion extending at an angle to the first portion at least partially around the wall of the connector member. The angle is can be more than 90 degrees. The first portion can include a beginning section that is wider than a remainder of the first portion. The connector channels can be generally L-shaped.

The coupling member can include a stabilizing member. The stabilizing member can provide support to prevent rotation of the connector member with respect to each of the coupling members.

According to a yet another aspect, a water board is disclosed. The water board can include a first section and a second section that can be adjacent to the first section. The second section can be joined to the first section by at least one connector system. The connector system can include a first member, a second member, and a third member. Each of the first member, second member, or the third member can include a cylindrical body. Each of the cylindrical bodies of the first and third members can include an open end. The first member, second member, and third member can be engaged such that the members are aligned on a common axis. The first member can be connected to the first section and the third member can be connected to the second section. The second member can be connected to the first member through the open end of the first member and to the second member through the open end of the second member. The first member and the third member can each have at least one internal projection that extend into a passage at each end of the second member along which the at least one internal projection can travel upon rotation of the second member about its longitudinal axis to unlock or lock the first and section sections relative to each other.

This disclosure provides a connector system for connecting solid foam products together, said system comprising a connector member having first and second ends; first and second coupling members. The connector member has walls forming a generally cylindrical connector body having and an inside and outside diameter and a longitudinal central axis. The coupling members each have walls forming generally cylindrical coupling bodies each having at least one open end and an inside and outside diameter, the walls having an inner surface and an outer surface. An inside diameter of each coupling member body is greater than an outside diameter of the connector member body, so that at least a portion of the first end of the connector member can be located into the open end of the first coupling member and at least a portion of the second end of the connector member can be located into the open end of the second coupling member. Each coupling member has at least one coupling projection extending inwardly from its inner surface. The first end of the connector member has a first connector channel through the wall of the connector member that is open at said first end and the second end of the connector member has a second connector channel through the wall of the connector member that is open at said second end. When the at least a portion of the first end of the connector member is located into the open end of the first coupling member and the at least a portion of the second end of the connector member is located into the open end of the second coupling member, each a sufficient distance, the at least one coupling projection of each coupling member engages with the respective one of the first and second connector channels. The connector channels are configured such that rotation of the connector member about its axis permits the at least one coupling projection of each coupling member to travel along the respective connector channel to a position where the connector member cannot be withdrawn axially from either coupling member.

The connector system typically further comprising a simple and easy to use actuator member for causing the connector member to rotate about its axis.

The actuator member may have an engagement feature and the connector member may comprise a fitting on or in the wall of the connector member and configured to receive the engagement feature. The engagement fitting may comprise a hole.

The actuator member may comprise a tool, which may comprise an elongate member, such as a rod. Such member or rod may have a distal end sized to fit the hole. The proximal end of the member or rod may comprise a gripping section, so that the actuator may be grasped by the hand and moved to cause rotation of the connecting member. The elongate member or rod may have a collar to limit the extent to which the distal end may enter the hole of the engagement fitting, and/or the amount of travel of the actuator member may be limited, for example by having a tube extending across the diameter of the connector member and the tube having a closed end to limit the extent to which the actuator member can pass along the tube.

The connector channels may begin at the at the first and second ends and of the connector member and comprise a first portion extending partially along the connector member generally parallel to the axis and a second portion extending at an angle to the first portion at least partially around the wall of the connector member. The angle may more than 90 degrees. The first portion may comprise a beginning section that is wider than the remainder of the first portion. The wider portion may gradually increase in width, in the direction to the ends of the connector member. The wider portion may facilitate entry of the coupling projections of the coupling members into the coupling channels.

The connector channels may be generally L-shaped.

Each coupling member may comprise at least one anchoring projection extending from its outer surface. Such projections may engage with the foam in use to resist rotation or twisting of the coupling members, for example when the connector member is caused to rotate for either disconnecting or connecting foam bodies. Such projections can be integrally formed on outer surface, or may extend through the wall or walls of the coupling members. For example, the coupling members may have a hole on either side of the coupling member walls and a rod or the like extending through the holes and projecting from either side of the coupling members. Such structures may be embedded in the foam by molding the foam around them.

Suitable foams include polyurethane, polystyrene and polyethylene/polystyrene foams.

This disclosure provides a water transport or water board comprising at least first and second sections, which may comprise mating first and second cross-sectional surfaces, and the sections are held together at these surfaces by at least one connector system, as disclosed herein.

The water transport may be in the form of a surfboard or a paddleboard. Such boards may be made in sections, such as by molding, or cut across their width to generate sections. Such sections reduce the size of the boarder when disconnected to make them smaller for easier transportation or storage. Typically, a surfboard may be in two sections and a paddle board in two or three sections, since the latter is typically longer.

Adjacent sections may be joined together by one, typically two, of the connector systems of this disclosure. Each wall of such sections to be joined together will therefore have a corresponding number of holes accommodating an open end of the coupling members, which extend parallel to the longitudinal axis of the board.

To accommodate the operation of the connecting systems described herein, the surface of the water transport or board may be recessed to facilitate access to and/or the operations of the connecting members. Such recessing may be on each of the mating sections of the water transport or board, for example in the form of a generally circular depression with one half on one section and the other half on the other section.

The water transport may be made of foam, such as by molding. The foam may comprise polyurethane, expanded polystyrene, extruded polystyrene, polypropylene, or expanded polypropylene and co-polymers of the foregoing, such as copolymers of polyethylene and polystyrene or of polystyrene, polyethylene and polypropylene. Such foam bodies may form the core of the water transport and have an external covering of resin, such as epoxy.

This disclosure provides a surfboard or paddleboard made into multiple sections, each section being joined to its neighboring section by at least one connector system comprising three generally cylindrically walled, open-ended members aligned on a common axis, with the first and third members located in the board on either side of the line(s) where the sections are to be joined and the second member inside of and bridging each of the first and second members. The first and third members have at least one internal projection extending into a bent passage in the wall of and at each end of the second member, respectively, along which the at least one internal projection can travel upon rotation of the second member to unlock or lock the sections together.

The features of the connector systems disclosed herein may be used in connection with such boards.

Some embodiments of this disclosure will now be more particularly described in and by the following drawings which are for the purposes of illustration only.

Methods of using the foregoing system(s) are included; the methods of use can include using or assembling any one or more of the features disclosed herein to achieve functions and/or features of the system(s) as discussed in this disclosure. Methods of manufacturing the foregoing system(s) are included; the methods of manufacture can include providing, making, connecting, assembling, and/or installing any one or more of the features of the system(s) disclosed herein to achieve functions and/or features of the system(s) as discussed in this disclosure.

BRIEF DESCRIPTION OF THE DRAWINGS

FIG. 5 is a perspective view of the assembled connector system showing the system in an attachment/unlock mode, according to some embodiments.

FIG. 7A is a cross-sectional view of a connector member similar to that shown in FIG. 1 and illustrating details of an actuator system.

FIG. 7B is a close up view of the area shown in FIG. 7A.

FIGS. 8A-8C illustrate various views a connector member, according to some embodiments.

FIGS. 11A-11E illustrate various views of an example water transport device with an example connector system.

DETAILED DESCRIPTION

Figure 1:
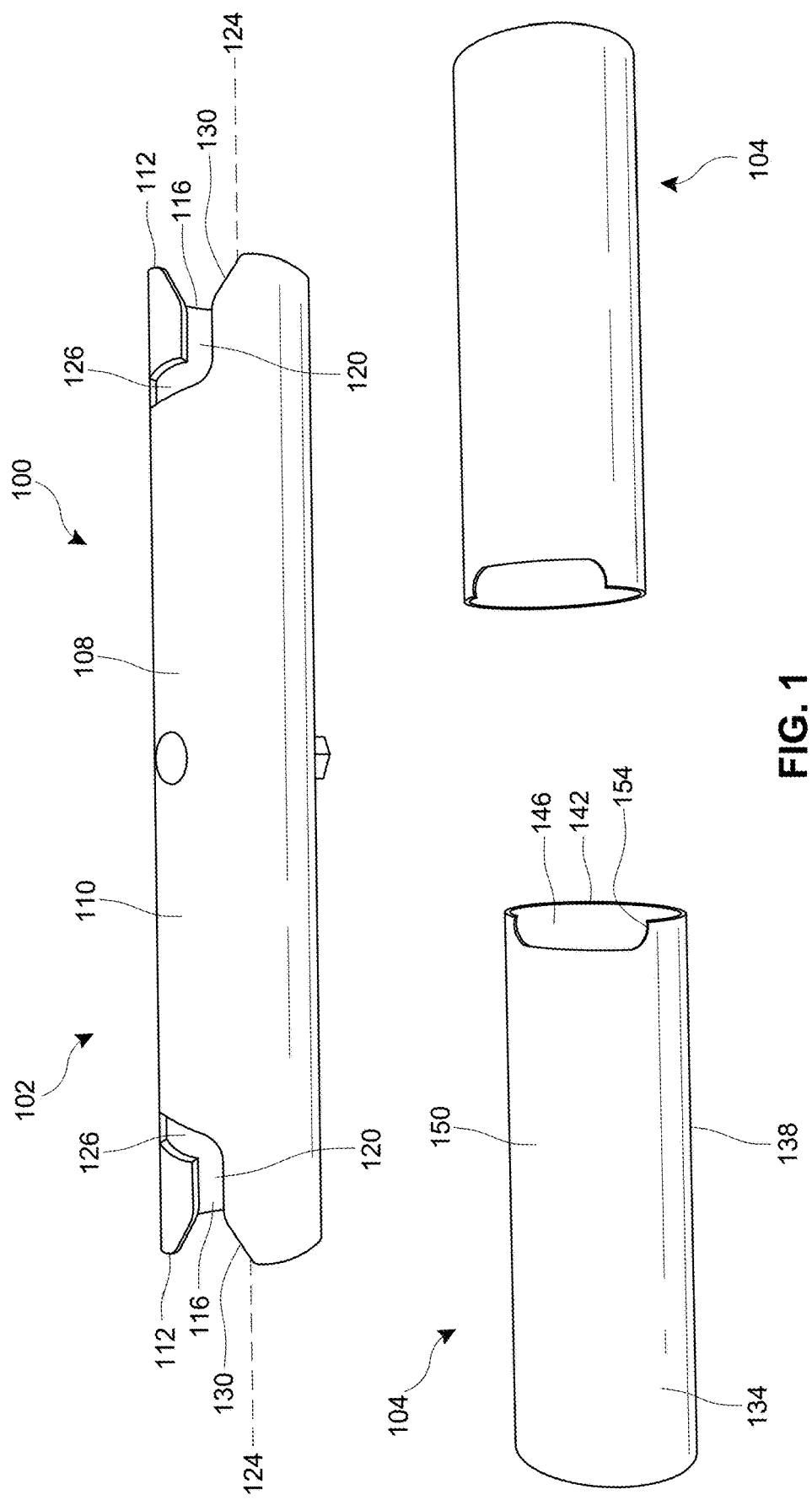
FIG. 1 shows various views of some components of a connector system, according to some embodiments.

FIG. 1 illustrates a connector system 100 including a connector member 102 or generally cylindrical connector such as a tube or conduit, a first coupling member 104 or a first generally cylindrical coupler such a tube or conduit and a second coupling member 104 or a second generally cylindrical coupler such a tube or conduit. The connector member 102 can include walls 108 forming a generally cylindrical connector body 110. Connector member 102 can include a first end 112 and a second end 112. First end 112 can include a first connector channel 116 and second end 112 can include a second connector channel 116. The connector channels 116 can each include a first portion 120, respectively, each extending generally parallel to the central axis 124 of connector member 102. The central axis 124 can be defined by the length of the connector member 102 or the coupling members 104. Each connector channel 116 can include a second portion 126, respectively, extending at an angle to the first portions 120, respectively, and extending at least partially around the wall 108 of the connector member 102.

The first portions 120 of each connector channel 116 can begin with an expanded portion 130 respectively. The expanded portion 130 can be a channel with a width or dimension that is larger than a width or dimension of the connector channel 116. The width or dimension can gradually or continually reduce toward the width or dimension of the connector channel 116 along the central axis 124 toward a center of the connector member 102. The expanded portion 130 can help guide an internal projection 300 (see FIGS. 3 and 3A) into the connector channel 116.

Coupling members 104 can each include walls 134 forming coupling bodies 138 respectively. The first and second coupling members 104 can each include at least one open end 142, an inside surface 146, and an outside surface 150. Open ends 142 of the coupling members can each have a cut out or recessed portion 154 respectively to make room for operation of the actuating system described in FIGS. 5 and 6, below.

Figure 1A:
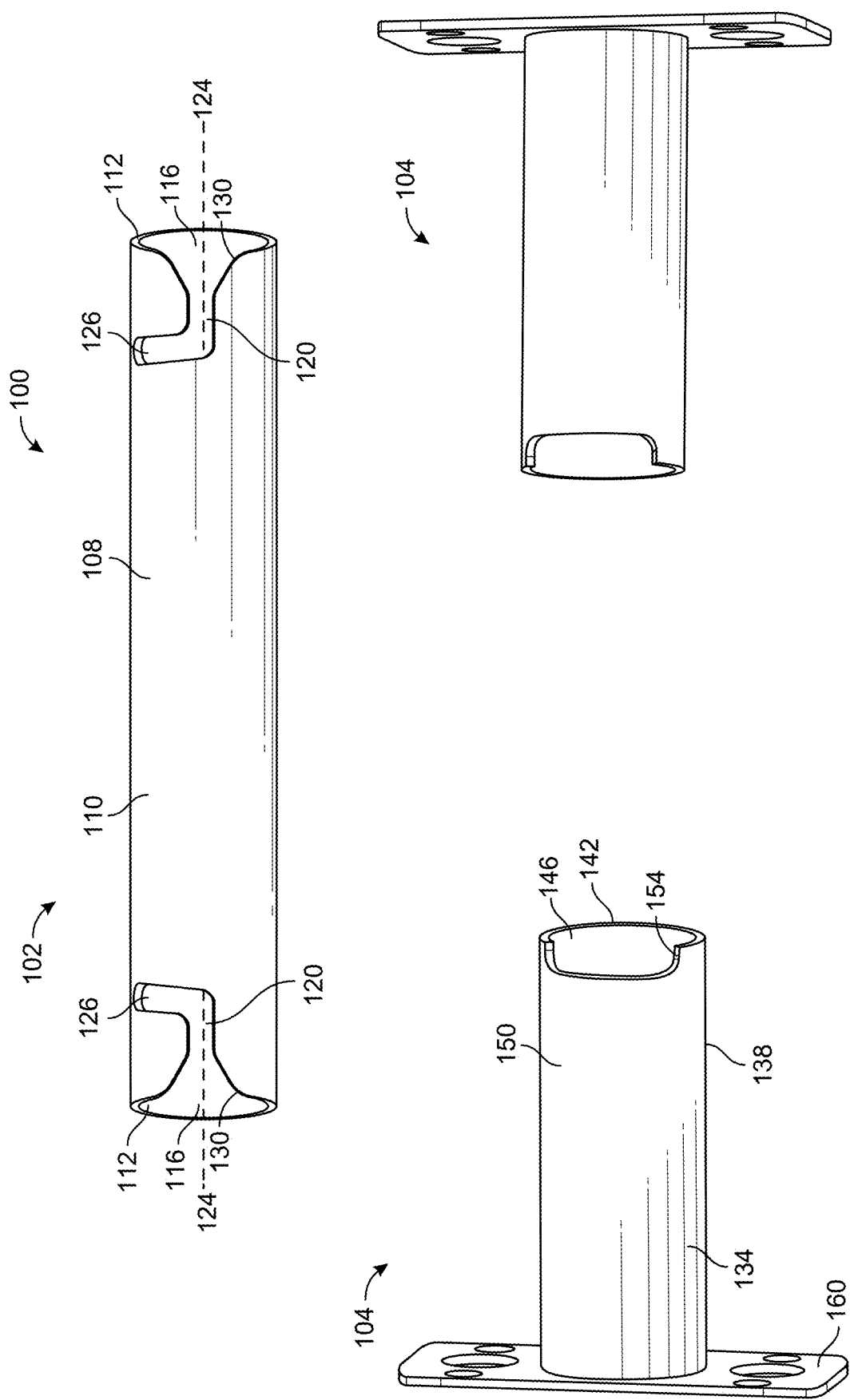
FIG. 1A shows various views of some components of a connector system, according to some embodiments.

FIG. 1A illustrates another example of the connector system 100. The connector system 100 can include a connector member 102, the first coupling member 104 and the second coupling member 104, as described above. The first and second coupling members 104 can each include a flange 160. As shown in FIG. 1A, the flanges 160 can be attached to the coupling members 104 at an end opposite from the open ends 142 that can each include the cut out or recessed portion 154 as described above.

Figure 2:
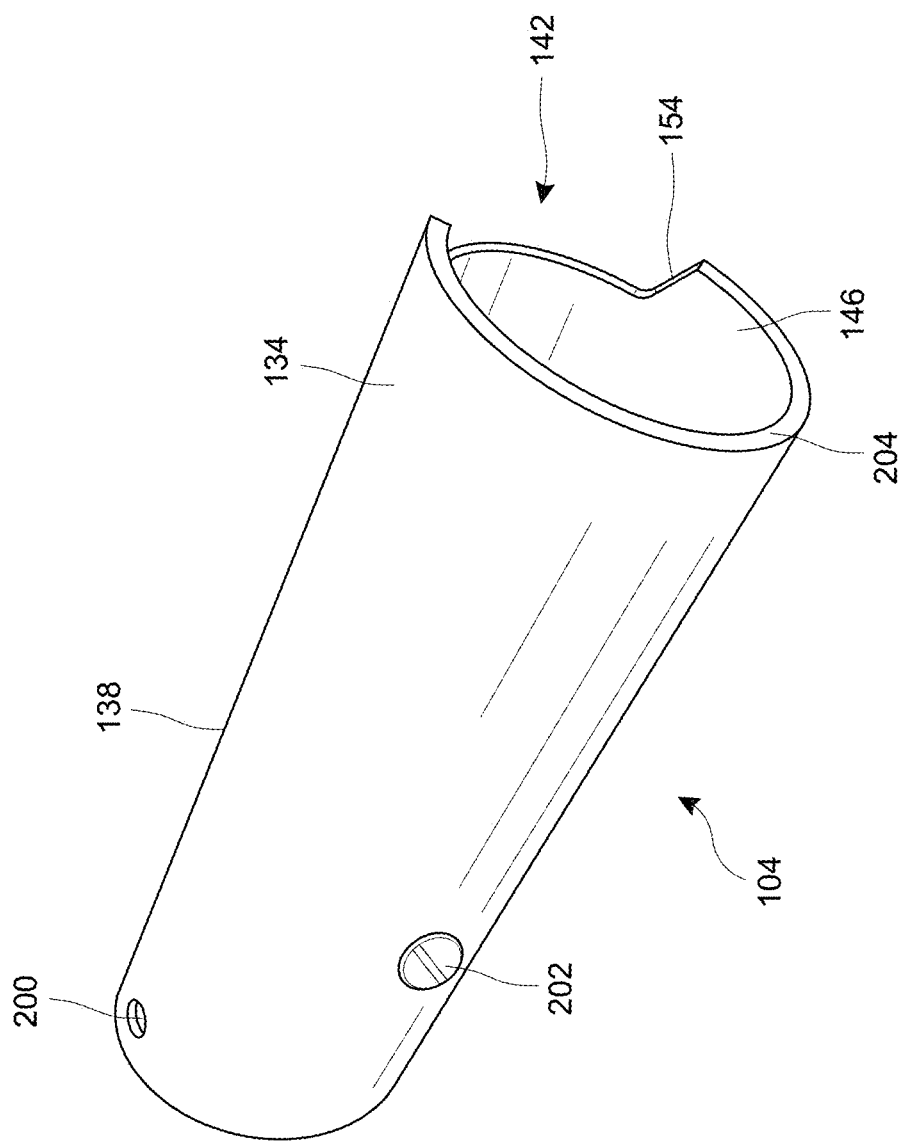
FIG. 2 is a perspective view of a coupling member of a component system, according to some embodiments.

FIG. 2 illustrates another view of the coupling member 104 shown in FIG. 1. Coupling member 104 can include walls 134 forming a generally cylindrical coupling body 138. An end of coupling member 104 is the open end 142, where the circumference 204 includes a cut out portion 154, again to make room for operation of the actuating system described in FIGS. 5 and 6 below. The cut-out portion 154 can be a recess from the open end 142 of the coupling member 104. The cut-out portion 154 can include a straight edge and a pair of rounded edges. The straight edge can run along the circumference of the coupling member 104. The rounded edges that connect the open end 142 and the straight edge of the cut-out portion 154. The cut-out portion 154 can be generally rectangular in shape.

A projection member 202, such as a screw, nail, boss, or protrusion can extend through the wall 134 to the interior of the coupling member 104 by projecting through the inner surface 146 of the coupling member 104. Projection member 202 can thereby provide a protrusion member 300 (FIGS. 3 and 3A) inside the coupling member 104. The wall 134 can be provided with a hole or opening 200 through which the protrusion member 300 (see FIG. 9) can be placed in order to anchor the coupling member within the foam body.

Figure 2A:
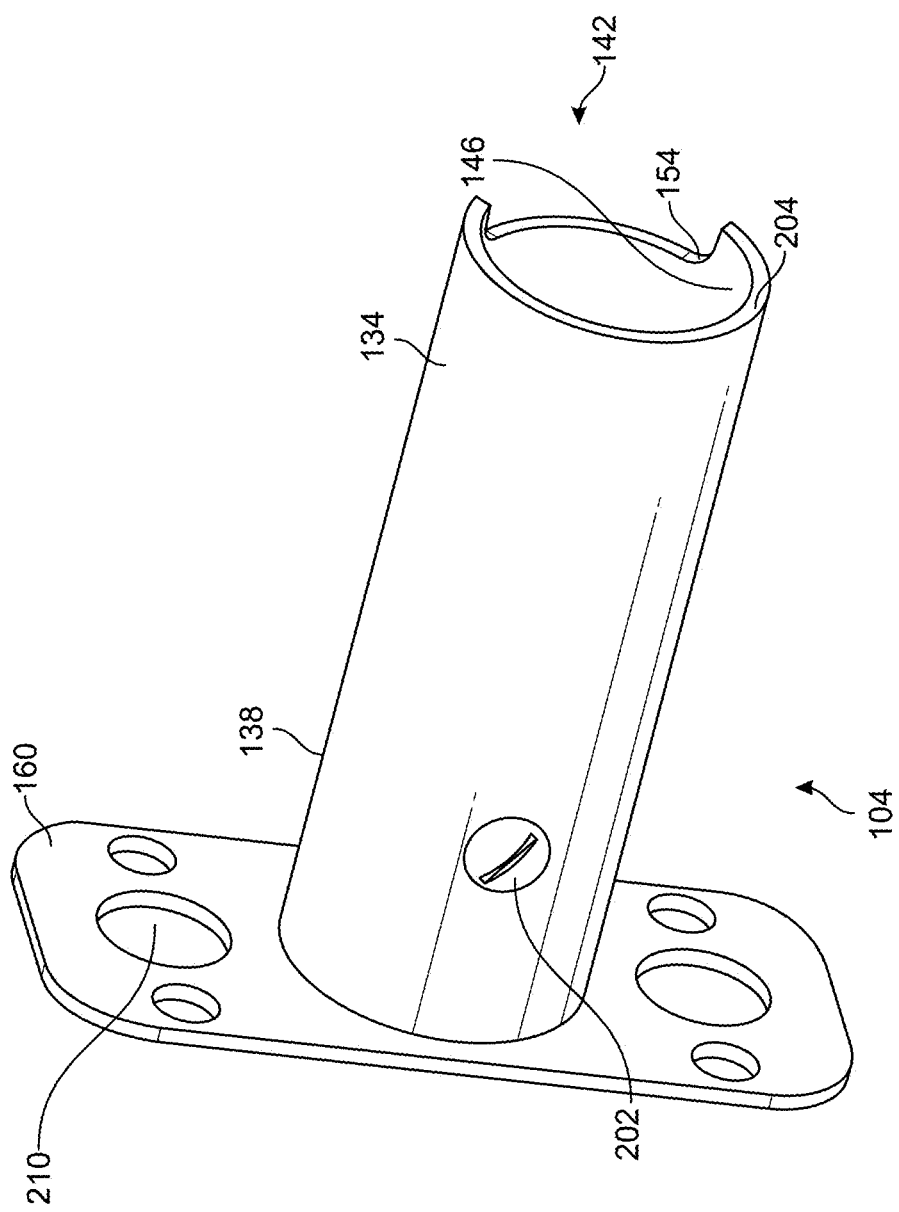
FIG. 2A is a perspective view of a coupling member of a component system, according to some embodiments.

FIG. 2A illustrates the coupling member 104 shown in FIG. 1A, including the flange 160. The flange 160 can be positioned opposite from the open end 142. The flange 160 can be integrated with the coupling member 104. The flange 160 can be modular and attached to the coupling member 104 using various methods including welding, adhesive, friction fit, snap fit, threading, and/or the like.

The flange 160 can be in different shapes. In some implementations, the flange 160 can be rectangular in shape as shown in FIG. 1A, or be circular, square, oval, and the like. A foam can be molded around the flange 160 such that at least a portion of the foam can be molded through openings 210 formed on the flange 160. The foam molded through the openings 210 can further embed the coupling members 104 within the foam. This can advantageously provide additional coupling between the flange 160 and the foam, which can resist rotation and therefore stabilize the coupling member 104 in the foam.

Figure 3:
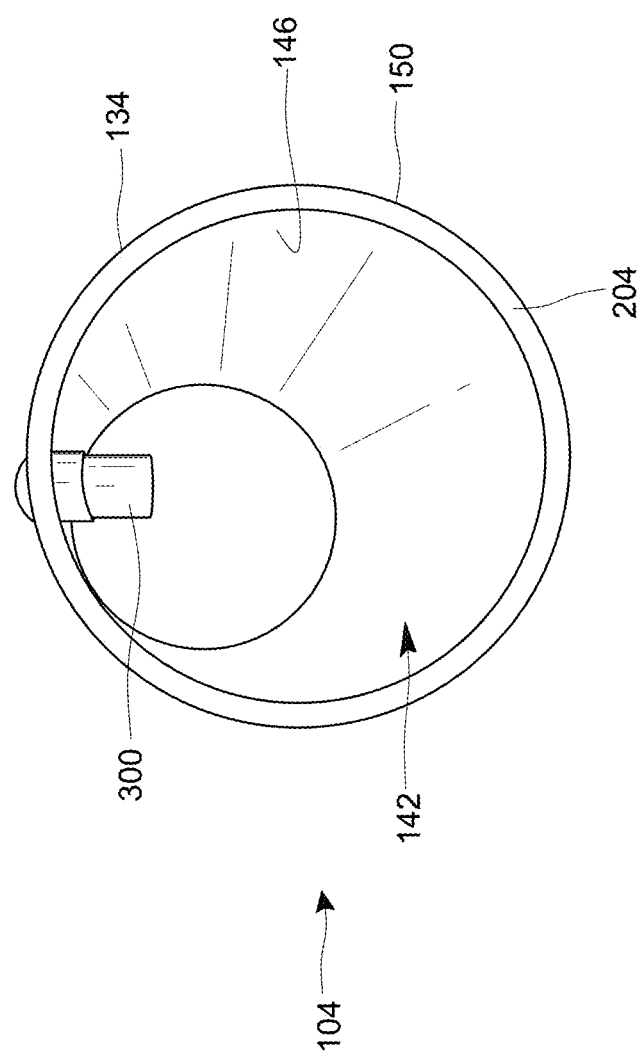
FIG. 3 is an end view of the coupling member of FIG. 2 in the direction shown in that figure.

FIG. 3 illustrates an end view of the coupling member of FIG. 2. In FIG. 3, coupling member 104 can includes walls 134 having an external outside surface 150 and an inside surface 146 and an open end 142 having a peripheral circumference 204. The protrusion member or coupling boss 300 can extend inwardly from inner surface 146. The protrusion member 300 can be a projection or boss, including a rod, pin, bar, shaft, dowel, and/or the like.

Figure 3A:
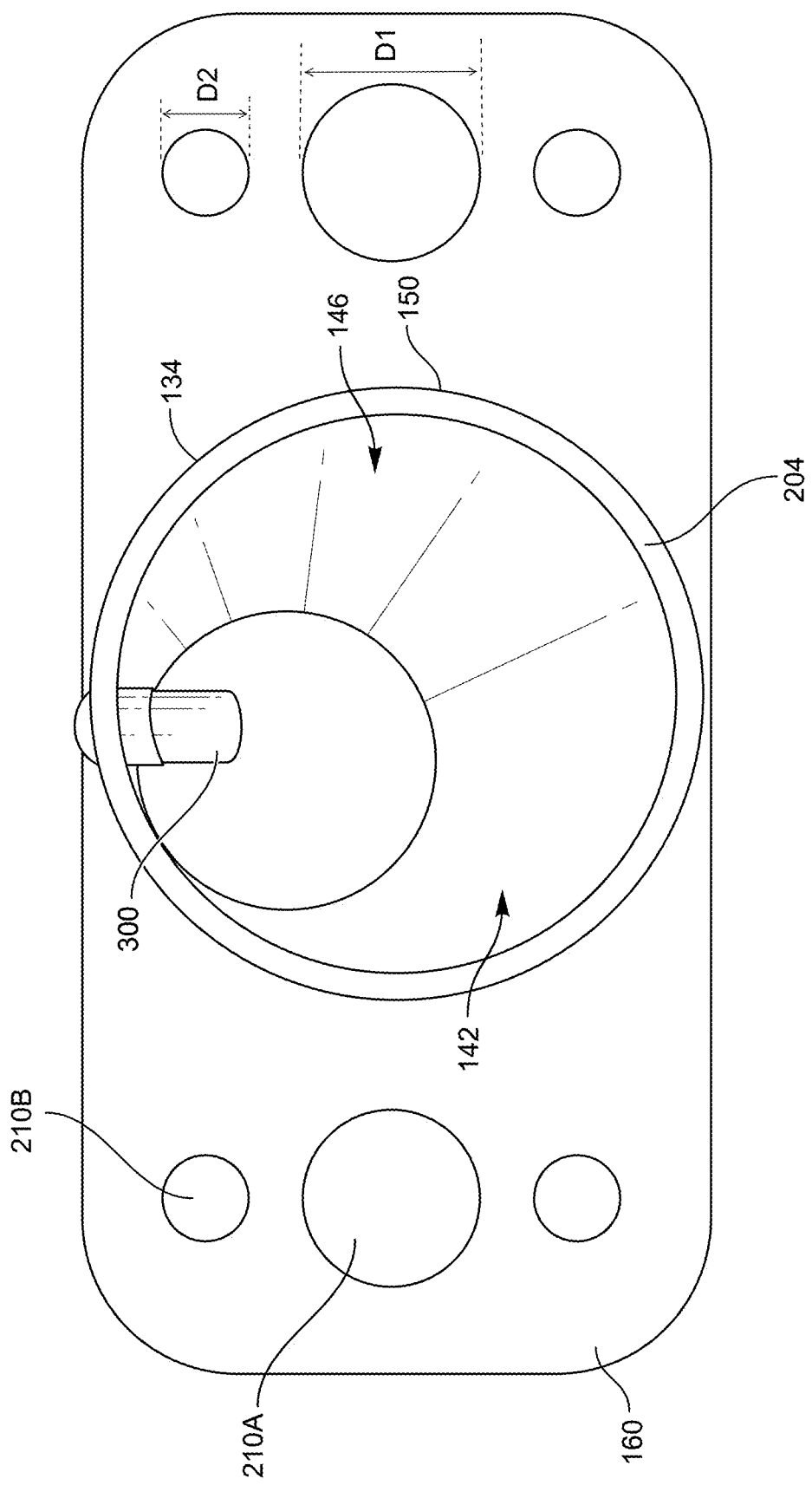
FIG. 3A is an end view of the coupling member of FIG. 2A in the direction shown in that figure.

FIG. 3A illustrates an end view of the coupling member of FIG. 2A. The flange 160 can include one or more openings 210. The flange 160 can include six openings 210 as shown in FIG. 2A. The flange 160 can include less than six openings 210 or more than six openings 210.

The flange 160 can include openings 210 with different sizes. The flange 160 can include a first opening 210 having a first diameter D1 and a second opening 210 having a second diameter D2. The dimensions (for example, diameter, depth, and the like) of the openings 210 can be varied to increase or decrease the amount of support provided by coupling between the foam and the openings 210. Openings 210 with larger diameter can provide more support than openings 210 with smaller diameter.

The first diameter D1 can be greater than the second diameter D2. The first diameter D1 can range between about 0.5 inches and about 2 inches, between about 0.75 inches and about 1.75 inches, between about 1 inch and about 1.5 inches, or about 0.5 inches, about 0.75 inches, about 1 inch, about 1.25 inches, about 1.5 inches, about 1.75 inches, about 2 inches, or ranges including any two of aforementioned values. The second diameter D2 can range between about 0.1 inches and about 1.5 inches, between about 0.25 inches and about 1.25 inches, between about 0.5 inches and about 1 inch, or about 0.1 inches, about 0.25 inches, about 0.5 inches, about 0.75 inches, about 1 inch, about 1.25 inches, about 1.5 inches, or ranges including any two of aforementioned values.

Figure 4:
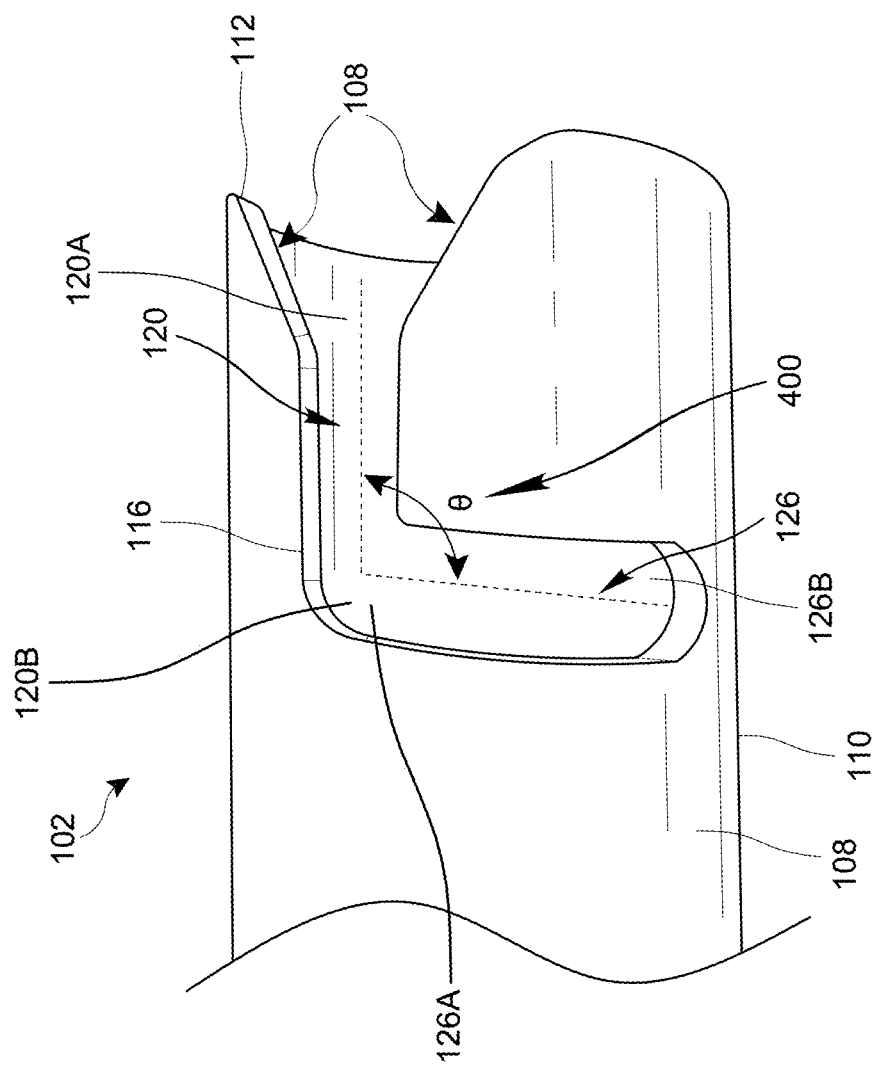
FIG. 4 is a close up side view of a connector channel of the connector member, according to some embodiments.

FIG. 4 illustrates a close-up view of a portion of the connector member 102. The connector member 102 can include walls 108 forming a generally cylindrical body 110. Open end 112 can provide access to a connector channel 116. The connector channel 116 can include the first portion 120, which is generally parallel to the central longitudinal axis of the connector member 102. Additionally and/or alternatively, the connector channel 116 can include the second portion 126 at an angle 400 with respect to the first portion 120. The second portion 126 can be formed along the circumference of the connector member 102. The expanded portion 130 can include a cut-out formed on the open end 112 towards the first portion 120. The cut-out can include one or more of straight or curved edges to direct the protrusion member 300 towards the connector channel 116.

With respect to FIGS. 3, 3A, and 4, the connector channel 116 of the connector member 102 can receive the protrusion member 300 of the coupling member 104. The expanded portion 130 can facilitate coupling between the connector channel 116 and the protrusion member 300 as its width can be wider than the rest of the first portion 120 and the second portion 126.

The angle 400 (illustrated as θ) between the first portion 120 and the second portion 126 can vary. The angle 400 can be between about 75 degrees and about 105 degrees, between about 80 degrees and about 100 degrees, between about 85 degrees and about 95 degrees, or about 75 degrees, about 80 degrees, about 85 degrees, about 90 degrees, about 95 degrees, about 100 degrees, about 105 degrees, or ranges including any two of aforementioned values. The angle 400 between the first portion 120 and the second portion 126 can be about 90 degrees.

In some implementations, the first portion 120 and the second portion 126 can be oriented to approximate the connector member 102 and the coupling member 104 as the connector channel 116 of the connector member 102 engages the protrusion member 300 of the coupling member 104. The angle 400 between the first portion 120 and the second portion 126 can be greater than 90 degrees. As the protrusion member 300 engages the second portion 126 via relative rotation of the coupling member 104 and the connector member 102 about the center axis 124, it can cause the coupling member 104 to move further onto and towards a center of the connector member 102, thereby approximating the two. The angle 400 between the first portion 120 and the second portion 126 can be about 98 degrees. Such configuration can cause the coupling member 104 to be further moved onto and towards the center of the connector member 102 by about ⅛ inches.

As shown in FIG. 4, the first portion 120 and the second portion 126 can be connected. The connector channel 116 (that is, the first portion 120 and the second portion 126 together) can be generally L-shaped. The first portion 120 can include the proximal end 120A and a distal end 120B. The distal end 120B can be positioned along the axis 124 and away from the proximal end 120A. The second portion 126 can include a proximal end 126A and a distal end 126B. The proximal end 126A of the second portion 126 can overlap with the distal end 120B of the first portion 120. The distal end 126B can be positioned along the circumference of the connector member 102 and positioned along an axis orthogonal to the axis 124.

The configuration (or orientation) of the first portion 120 and the second portion 126 can be varied to change the degree of approximation between the connector member 102 and the coupling member 104 as described above. The length and/or the angle 400 can be varied to change the degree of approximation between the connector member 102 and the coupling member 104. As the angle 400 increases, the degree of approximation—movement not and toward the center of the connector member 102—can also increase, and vice versa. As the length of the second portion 126 increases, the degree of approximation can also increase, and vice versa.

FIG. 5 illustrates a connector system 100, having a connector component as shown in FIG. 1, and further including an actuator 500. The actuator 500 can include a projection or boss, including a rod, pin, bar, shaft, dowel, and/or the like. Connector member 102 can be located between and inside a first coupling member 104 and second coupling member 104. The connector member 102 can have an external circumference or outer diameter smaller than the internal circumference or inner diameter of the coupling members 104. The connector member 102 can be positioned or located within and can rotate within the coupling members 104. The connector member 102 can be moved by means of movement of the protrusion member 300 inside the coupling members 104 along the connector channels 116 as previously described.

In FIG. 5, the actuator 500 is shown engaged with a fitting 502 located in the outer wall of connector member 102. Actuator 500 can include a rod 504 having a first portion 506 having a first diameter and a second portion 508 having a second diameter to limit the travel of actuator 500 into fitting 502. The second diameter of the second portion 508 can be greater than the first diameter of the first portion 506. When the connector member 102 is fully engaged with the coupling members 104, the connection member 102 can rotated about the center axis 124 in a direction R1, as shown in FIG. 5. Rotation of the connector member 102 can be made when the protrusion member 300 is positioned at the distal end 120B of the first portion 120 (or a proximal end 126A of the second portion 126) of the connector channel 116.

The connector member 102 can include a locked position or mode and an unlocked position or mode. The connector member 102 can be rotated between the locked position and the unlocked position with respect to a longitudinal axis (that is, the center axis 124) defined by the length of the connector member 102. When the connector member 102 is in the locked position, the connector member 102 is locked with and fixed along the axis 124 (see FIG. 1) relative to the coupling members 104. In this regard, the connector member 102 cannot be separated from the coupling members 104. As illustrated in FIG. 5, the connector member 102 is in the locked position.

The relative position of the protrusion member 300 with respect to the connector channel 116 can determine whether the connector member 102 is in its locked position or mode or unlocked position or mode. When the protrusion member 300 (see FIG. 3) of the coupling members 104 is positioned within the first portion 120 of the connector channel 116 (see FIG. 4), the connector member 102 can move along the axis 124 with respect to the coupling members 104. Likewise, the coupling members 104 can move along the axis 124 with respect to the connector member 102. When the protrusion member 300 is at the distal end 120B of the first portion 120, the protrusion member 300 can no longer move longitudinally away from the opening or proximal end 120A of the first portion 120. In other words, when the protrusion member 300 is at the distal end 120B of the first portion 120, the connector member 102 cannot further slide into the coupling member 104. Once the protrusion member 300 is at the distal end 120B of the first portion 120, the connector member 102 can be rotated about the axis 124 to cause the protrusion member 300 to move along the second portion 126. As the connector member 102 is rotated about the axis 124, the protrusion member 300 can move between the proximal end 126A and the distal end 126B of the second portion 126. When the protrusion member 300 is positioned between the proximal end 126A and the distal end 126B, engagement between the protrusion member 300 and the second portion 126 can prevent longitudinal movement of the connector member 102 (or coupling member 104) along the axis 124.

The external diameter (or outer diameter) of the connector member 102 can be between about 1 inch and about 3 inches, between about 1.25 inches and about 2.75 inches, between about 1.5 inches and about 2.5 inches, between about 1.75 inches and about 2.25 inches, or about 1 inch, 1.25 inches, 1.5 inches, 1.75 inches, 2 inches, 2.25 inches, 2.5 inches, 2.75 inches, 3 inches, or ranges including any two of aforementioned values. The internal diameter (or inner diameter) of the connector member 102 can be between about 0.75 inches and about 2.75 inches, between about 1 inch and about 2.5 inches, between about 1.25 inches and about 2.25 inches, between about 1.5 inches and about 2 inches, or about 0.75 inches, 1 inch, 1.25 inches, 1.5 inches, 1.75 inches, 2 inches, 2.25 inches, 2.5 inches, 2.75 inches, or ranges including any two of aforementioned values.

The external diameter (or outer diameter) of the coupling members 104 can be between about 2 inch and about 4.5 inches, between about 2.25 inches and about 4.25 inches, between about 2.75 inches and about 4 inches, between about 3 inches and about 3.75 inches, between about 3.25 inches and about 3.5 inches, or about 2 inches, 2.25 inches, 2.5 inches, 2.75 inches, 3 inches, 3.25 inches, 3.5 inches, 3.75 inches, 4 inches, 4.25 inches, 4.5 inches, or ranges including any two of aforementioned values. The internal diameter (or inner diameter) of the coupling members 104 can be between about 2 inches and about 4 inches, between about 2.25 inches and about 3.75 inches, between about 2.5 inches and about 3.5 inches, between about 2.75 inches and about 3.25 inches, or about 2 inches, 2.25 inches, 2.5 inches, 2.75 inches, 3 inches, 3.25 inches, 3.5 inches, 3.75 inches, 4 inches, or ranges including any two of aforementioned values.

The thickness of the coupling member 104 and the connector member 102 can be between about 0.1 inch and about 0.3 inches, between about 0.15 inches 0.25 inches, or about 0.1 inch, 0.15 inches, 0.2 inches, 0.25 inches, 0.3 inches, or ranges including any two of aforementioned values.

Figure 5A:
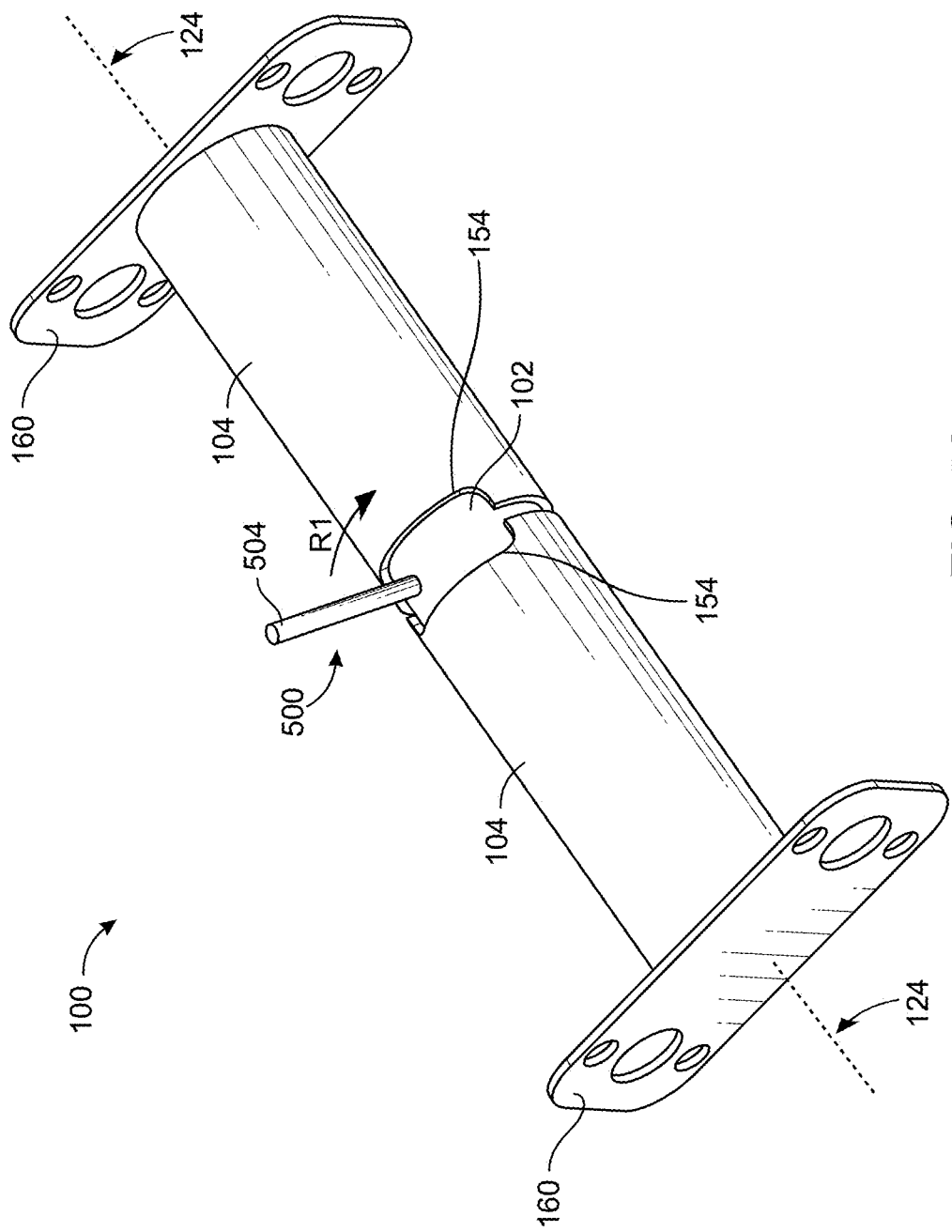
FIG. 5A is a perspective view of the assembled connector system showing the system in an attachment/unlock mode, according to some embodiments.

FIG. 5A illustrates another connector system 100 including coupling members 104 each having the flange 160. As discussed above flanges 160 can be positioned opposite from the open end 142 of the coupling members 104 and provide additional support that prevent rotation of the coupling members 104. The cut-out portions 154 of the coupling members 104 can create a space for the actuating member 500 to move back and forth.

Figure 6:
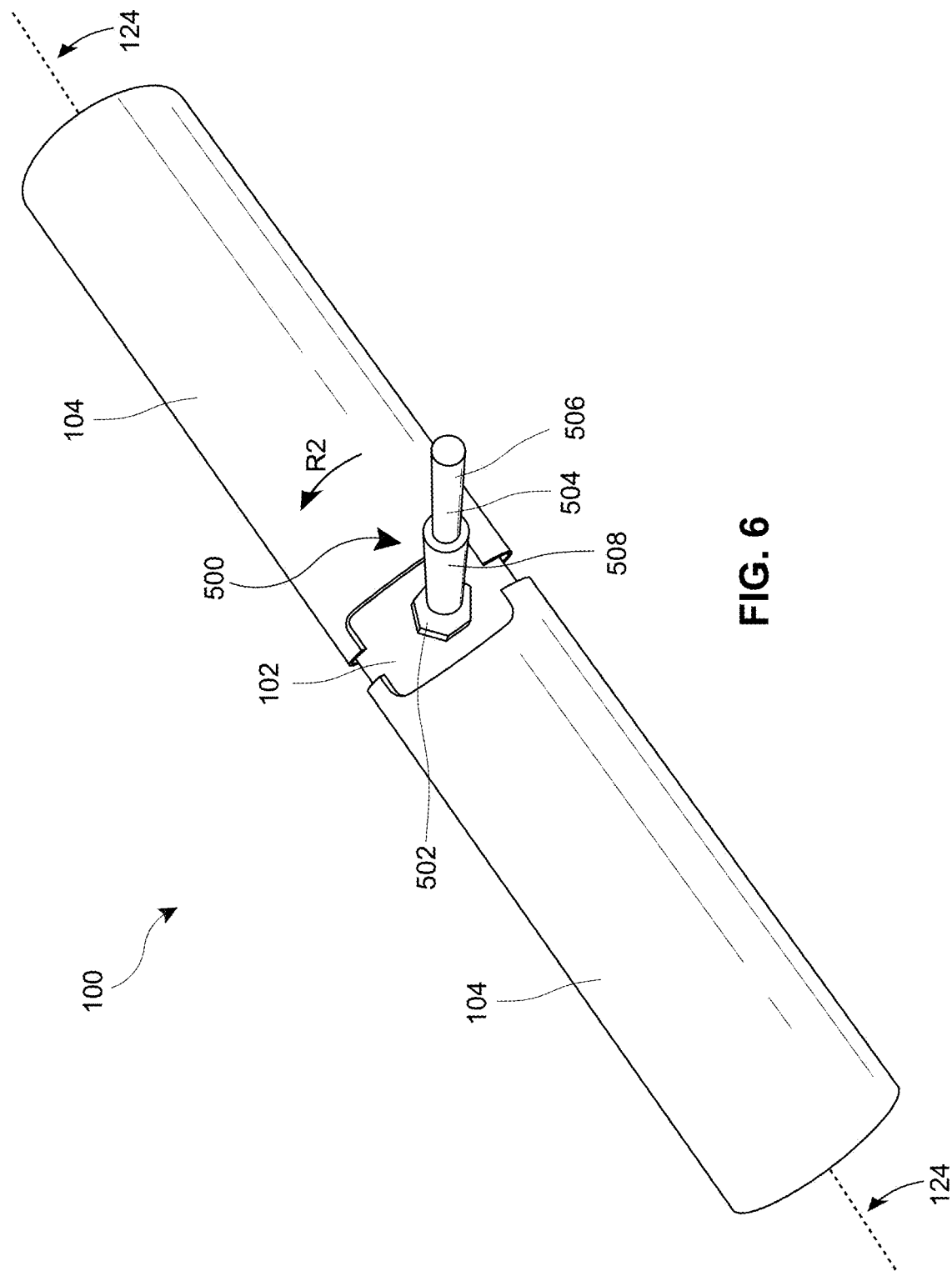
FIG. 6 is a perspective view of the connector system of FIG. 5 showing the system in the locked together mode.

When the connector member 102 is rotated in the direction R1 (see FIG. 5), the projection 300 inside of each coupling member 104 (shown in FIG. 3) can move within the second portion 126 of the coupling channel 116 toward the distal end 126B (see FIG. 4). Alternatively, the connector member 102 can be rotated in a direction R2 as shown in FIG. 6. Rotating the connector member 102 in the direction R2 can move the projection 300 along the second portion 126 of the coupling channel 116 toward the proximal end 126A. As discussed above, once the protrusion member 300 is at the proximal end 126A of the second portion 126, the connector member 102 can be separated from the coupling members 104.

Figure 6A:
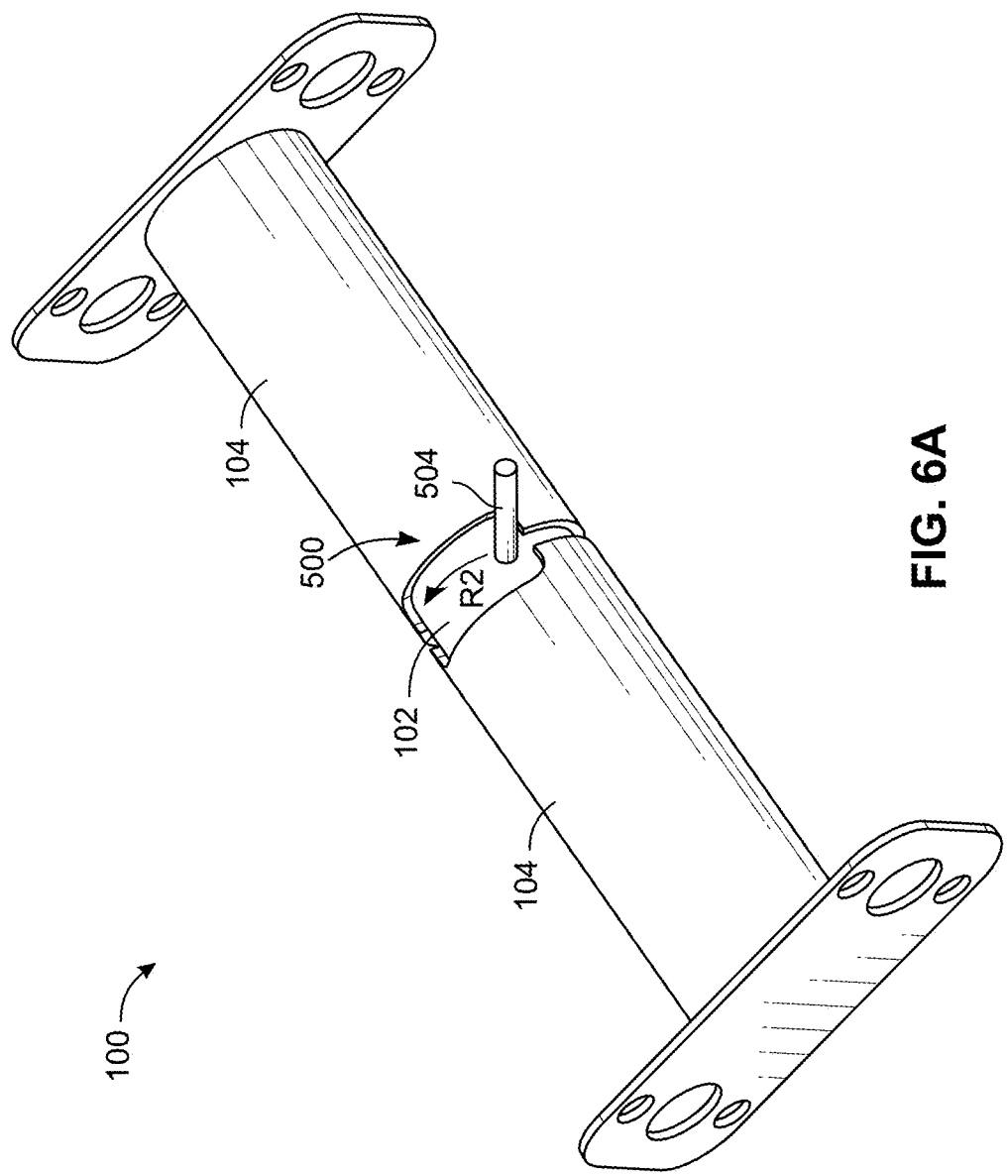
FIG. 6A is a perspective view of the connector system of FIG. 5A showing the system in the locked together mode.
Figure 7D:
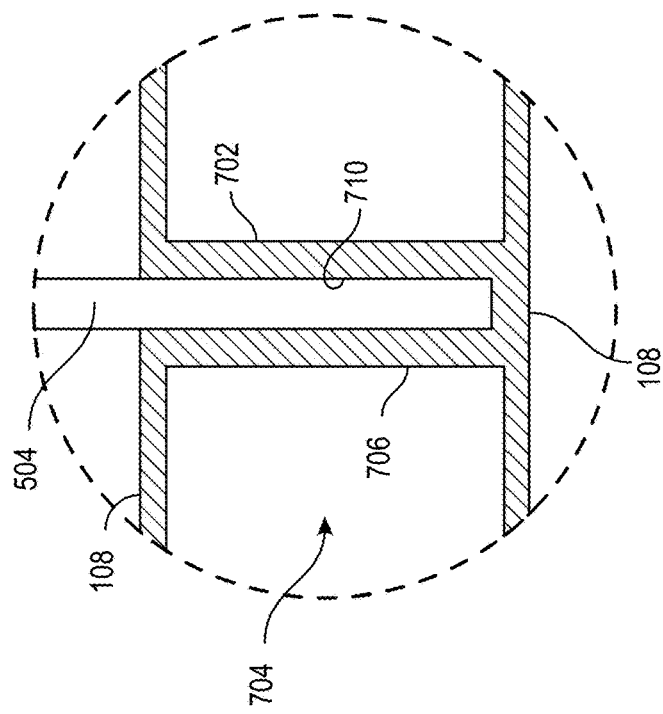
FIG. 7D is a close up view of the area shown in FIG. 7C.
Figure 7C:
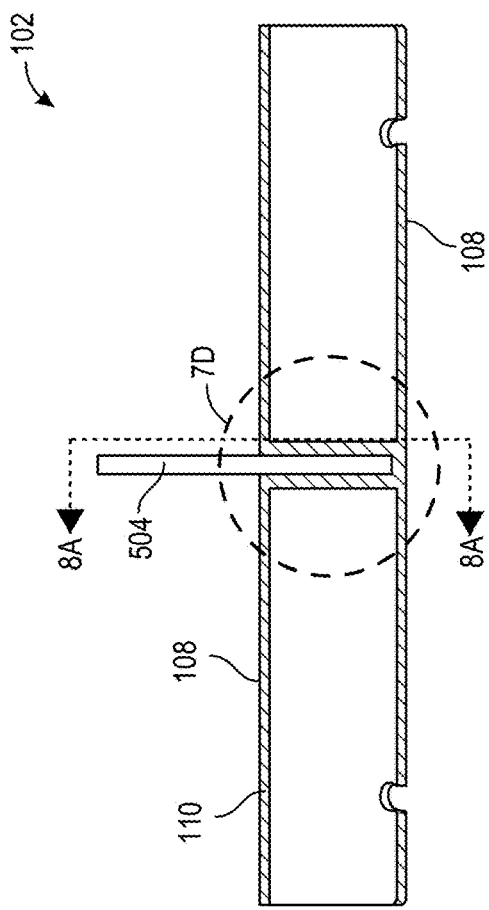
FIG. 7C is a cross-sectional view of a connector member similar to that shown in FIG. 1A and illustrating details of an actuator system.

In some implementations, the connector member 102 does not include the nut 502, as illustrated in FIGS. 5A and 6A. Instead, the rod 504 of the actuator 500 can slidingly mate with the connector member 102 as shown in FIGS. 7C and 7D. Any other suitable attachment means between the rod 504 of the actuator 500 and the connector member 102 can be used including welding, adhesive, friction fit, snap fit, threading, and/or the like.

FIG. 7A illustrates a connector member 102 having a generally cylindrical connector body 110 having a hole or an opening 700 and a hole or an opening 702. The connector body 110 can be formed from the outer walls 108 having the openings 700, 702 as shown in FIG. 7B. A fitting 704 can include a generally tubular member 706 having an outer wall 708 and an interior channel 710. The fitting 704 can include a distal end 712 and a proximal end 714. Adjacent the proximal end 714, the exterior wall 708 can include a step down or reduced cross-section 716. The distal end 712 can include a wall 720 defining an end of the channel 710 at the distal end 712 of the fitting 704. The wall 720 can be sized to fit the hole 702 and the step-down 716 can be sized to fit the hole 700, as shown in FIG. 7B. Accordingly, with the wall 720 substantially flush with the wall 708 of the fitting 704, movement of the fitting 704 can be limited by engagement between with the wall 108 and the step down 716. The nut 502 about the proximal portion of fitting 704 can serve to further push the fitting 704 against wall 108 of the connector member 102 thereby holding the fitting 704 in place. As shown in FIGS. 7A and 7B, the rod 504 (or the actuator member 500) can be inserted into the channel 710, its travel stopped by the wall 720 of the fitting 704.

With respect to FIGS. 7C and 7D, the fitting 704 can be integrated with the connector member 102 such that the channel 710 is a part of the connector member 102. The connector member 102 can be without the nut 502. The actuator member 500 can be removably inserted into the channel 710 of the fitting 704. In this regard, users can insert the actuator member 500 to rotate the connector member 102 from the unlocked position to the locked position, and vice versa. The actuator member 500 can be removed from the channel 710 of the fitting 704 after use.

Figure 8:
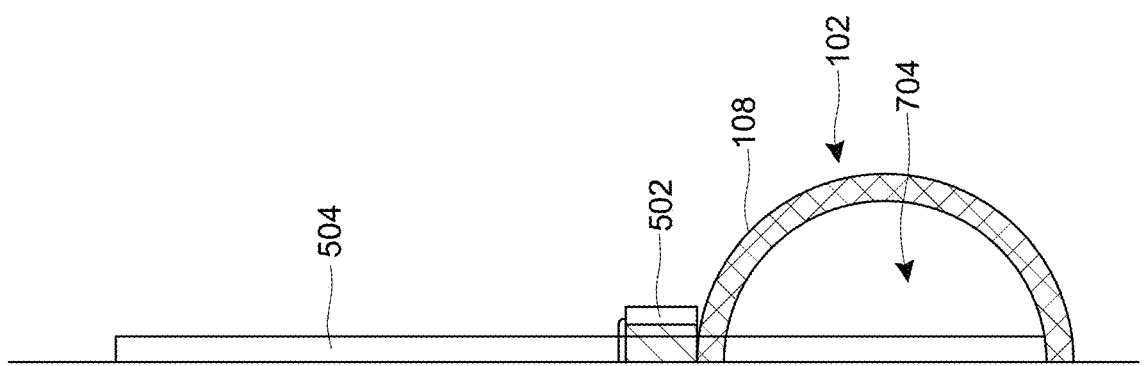
FIG. 8 is a cross-sectional view of a connector member, according to some embodiments.

FIG. 8 shows a cross-section view of the connector member 102 shown in FIG. 7A. As discussed above, the rod 504 of actuator member 500 can extend through the opening 700 of the wall 108 of the connector body 110. The channel 710 can be oriented such that the rod 504 can extend through a substantial portion of the diameter of the connector member 102. In some examples, the rod 504 can extend through less than half or greater than half of the diameter of the connector member 102.

FIGS. 8A-8C illustrate additional views of the actuator system 100 shown in FIGS. 7C and 7D. FIG. 8A shows a cross-section view of the connector member 102 shown in FIG. 7C. The FIG. 8B illustrates the connector member 102 with the opening 700. As discussed above with respect to FIGS. 7C and 7D, the connector member 102 shown in FIGS. 8A an 8B does not include the nut 502. FIG. 8C illustrates the rod 504. The rod 504 can have a uniform thickness along its length. In some examples, the rod 504 can have varying thickness along its length. As discussed with respect to FIG. 5, the rod 504 can include portions with different thicknesses.

Figure 9:
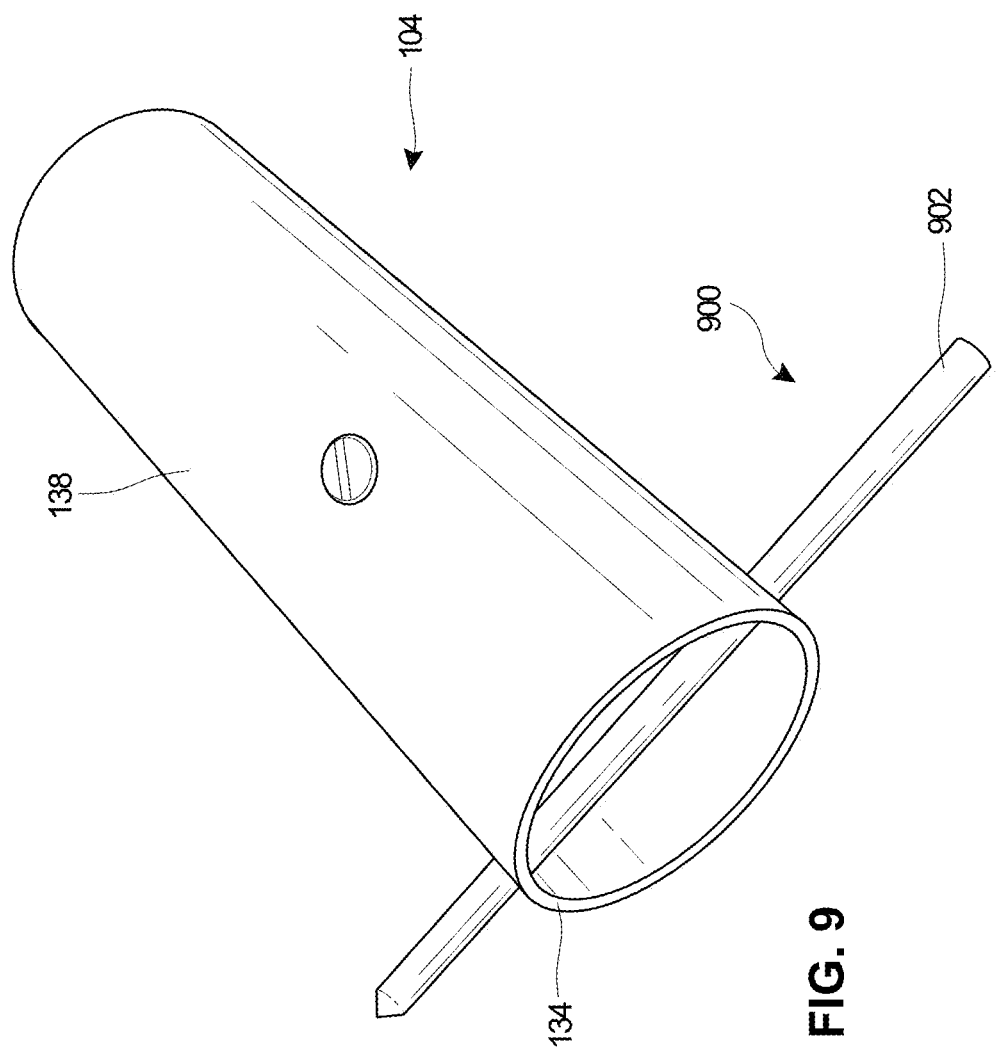
FIG. 9 is a perspective view of a coupling member showing a stabilizing component, according to some embodiments.

FIG. 9 illustrates the coupling member 104 that includes a stabilizing member 900. The stabilizing member 900 can be useful when such coupling members 104 are embedded in a foam body of a water transport (for example, water craft, paddle board, and the like). The stabilizing member 900 can be embedded within the foam body to resist rotation and therefore stabilize the coupling member 104. The stabilizing member 900 can be used to hold the coupling member 104 in place while the connector member 102 is rotated relative to the coupling members 104. In some implementations, the stabilizing member 900, such as a metal rod 902 as shown in FIG. 9, can extend through the body 138 of the coupling member 104. The stabilizing member 900 can extend through the wall 134 at a first location, extend through the diameter of the coupling member 104, and extend through the wall 134 at a second location opposite from the first location. Additionally and/or alternatively, the stabilizing member 900 can extend through the wall 134 at only one location. The stabilizing member 900 can be a nonlinear. The stabilizing member 900 can have different cross-sectional shapes including, but not limited to, circular, oval, rectangular, square, hexagonal, and the like.

Figure 9A:
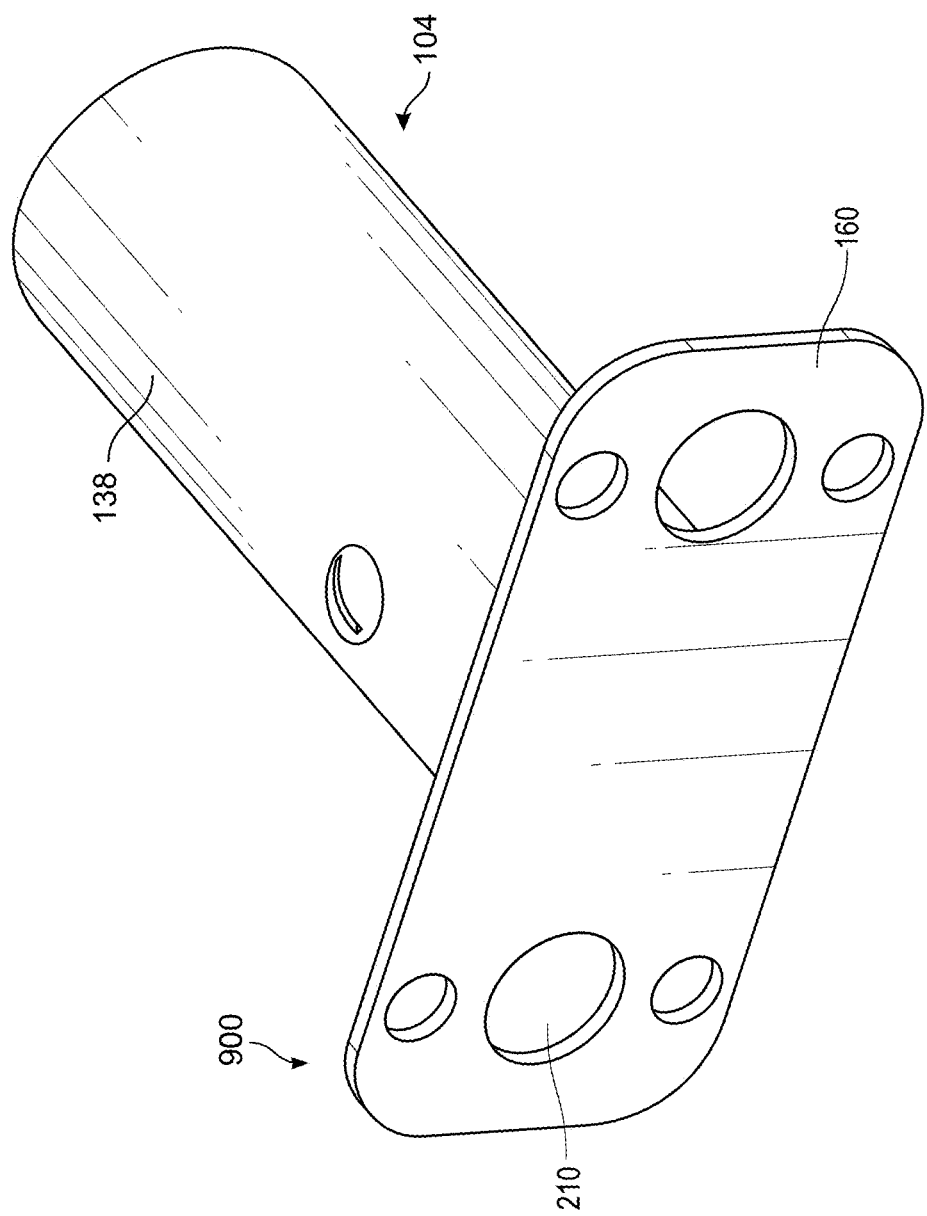
FIG. 9A is a perspective view of a coupling member showing a stabilizing component, according to some embodiments.

In some implementations, the coupling member 104 can include a flange as shown in FIG. 9A. The flange can act as a stabilizing member 900 for the coupling member 104 that can be useful in resisting rotation and stabilizing the coupling member 104 while being coupled with the connector member 100 (see FIGS. 7A-7D). As discussed above, the flange can include one or more openings. When molded into the foam of a water transport, the flange and its openings can act as a support that prevents rotation of the coupling member 104 within the foam.

Figure 10:
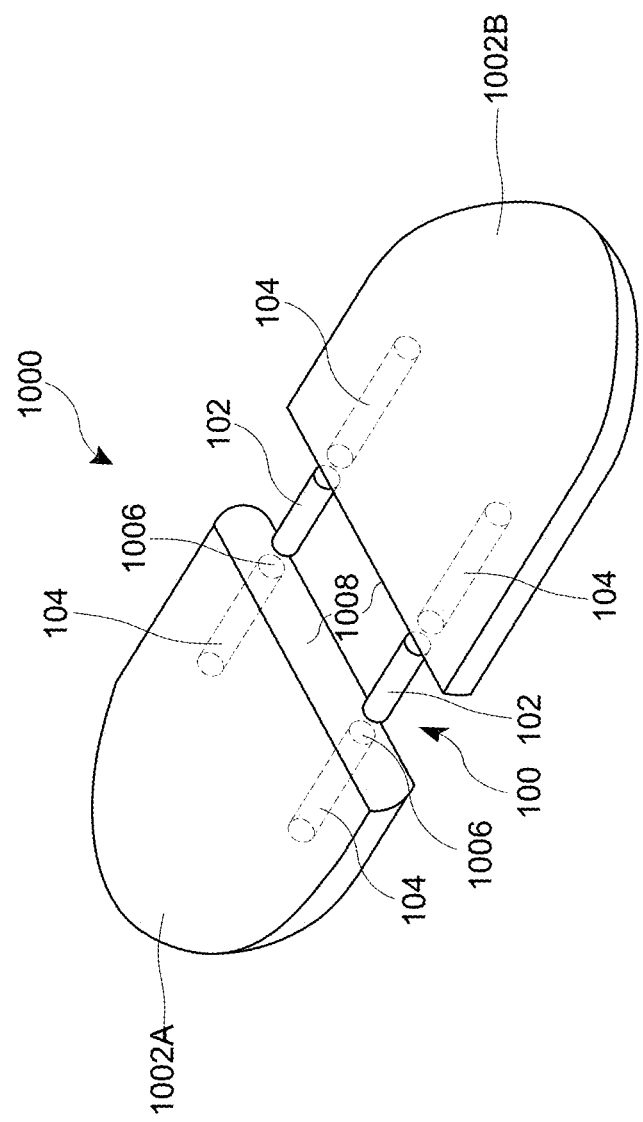
FIG. 10 illustrates a schematic view of a surf board or paddle board made into two sections and using a connector system according to some embodiments.

FIG. 10 illustrates a schematic view of a water transport or water board 1000 cross made into two sections 1002A, 1002B and using a connector system 100 as described herein. The water transport 1000 can be a surf board, paddleboard, and the like.

The connector system 100 can include the connector member 102, and coupling members 104 as previously described. Coupling members 104 can be embedded in the sections 1002A, 1002B of the water transport 1000 in suitably sized elongate holes 1006. The sections 1002A, 1002B can each include one or more surfaces 1008 located between their side surfaces. The surfaces 1008 can be cross-sectional surfaces of the sections 1002A, 1002B of the water transport 1000. When the sections 1002A, 1002B are brought together, the surfaces 1008 can be brought into contact. The surfaces 1008 of the sections 1002A, 1002B can be flush with respect to each other when the sections 1002A, 1002B are bought together. There can be some or no gaps between the sections 1002A, 1002B when they are brought together.

Each of the sections 1002A, 1002B of the water transport 1000 can include one or more of the elongate holes 1006. In some implementations, each of the sections 1002A, 1002B can include two holes 1006. In other implementations, each of the sections can include only one hole 1006 or have more than two holes 1006. The holes 1006 can be defined by the surfaces 1008 of the sections 1002A, 1002B respectively. The holes 1006 can be orthogonal with respect to the surfaces 1008. The holes 1006 can be formed at about 90 degrees with respect to the surfaces 1008. In this regard, the connector member 102 can be inserted into the sections 1002A, 1002B at about 90 degrees with respect to the surfaces 1008. The holes 1006 can be defined by the coupling members 102 embedded within the sections 1002A, 1002B.

Two such holes 1006 can be formed in each of the sections 1002A, 1002B and the holes of one section 1002A can be in axial alignment with the holes of the other section 1002B, and vice versa. Additionally and/or alternatively, the coupling members 104 can be molded into the sections 1002A, 1002B during production of the sections 1002A, 1002B. The sections 1002A, 1002B can be injection molded around the coupling members 104. The two sections 1002A, 1002B can be connected together by respective connector members 102 engaging with the coupling members 104 as described herein.

Figure 10A:
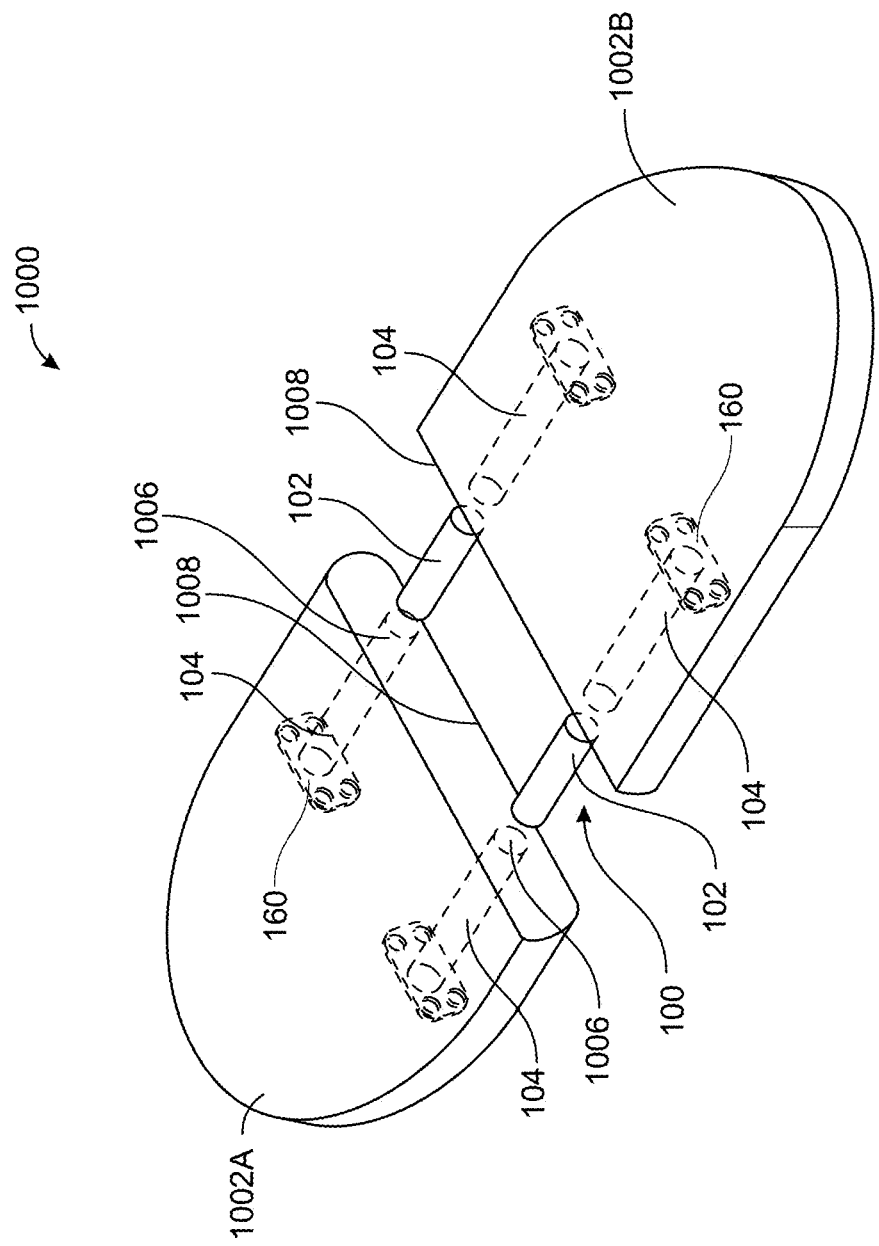
FIG. 10A illustrates a schematic view of a surf board or paddle board made into two sections and using a connector system according to some embodiments.

In some implementations, the coupling members 104 can include the flange 160 (see FIG. 10A) as described herein. The sections 1002A, 1002B can be molded around the coupling members 104 such that the sections 1002A, 1002B surrounds the coupling members 104 and the flanges 160. The flanges 160 can be embedded within the sections 1002A, 1002B to prevent rotation of the coupling members 104 about the axis 124 (see FIG. 1) with respect to the sections 1002A, 1002B or with respect to the connector member 102.

Figure 11A:
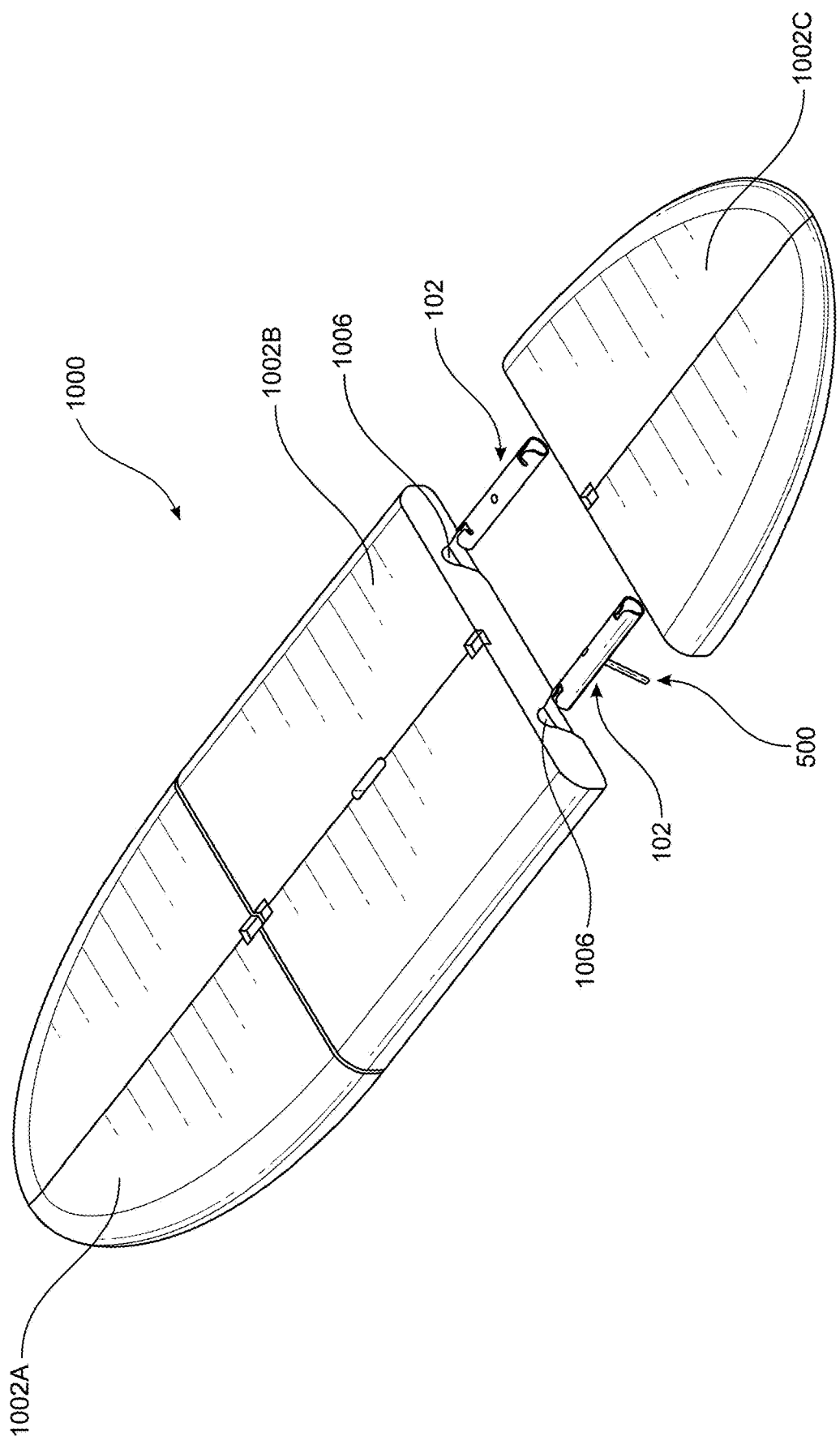

Additionally and/or alternatively, the board 1000 may be made into three sections, as shown in FIGS. 11A-11E, and use a corresponding number of connector systems 100. As shown in FIG. 11A, the board 1000 can include three sections. The board 1000 can include more than three sections connected via the connector system 100 as described herein.

The sections 1002A, 1002B, 1002C can each include one or more holes 1006. The coupling members 104 within the sections 1002A, 1002B, 1002C can define the holes 1006. The holes 1006C can be dimensioned to slidingly receive the connector members 102. The connector members 102 can include an actuator member 500 as described herein. The actuator member 500 can be modular or integrated with the connector member 102. The actuator member 500 can be used to rotate the connector members 102 once the connector members 102 are inserted into the holes 1006.

FIG. 11B illustrates a top view of the board 1000. The connector members 102 can be positioned within the board 1000 such that it is parallel to an axis defined by the length of the board 1000.

FIGS. 11C and 11D illustrates a close-up view of interaction between the coupling members 104 and the connector member 102. As shown in FIGS. 11C and 11D, the protrusion member 300 of the coupling members 104 can be inserted into the connector channel 116. In the example shown in FIGS. 11C and 11D, the protrusion member 300 is positioned at the distal end 120B of the first portion 120 (or the proximal end 126A of the second portion). In this regard, the connector member 102 is fully inserted into the coupling member 104 embedded within the sections of the board 1000, thereby preventing the connector member 102 to be inserted further into the coupling members 104.

Once the protrusion member 300 is positioned at the distal end 120B of the first portion 120 of the connector channel 116, the connector member 102 can be rotated with respect to the coupling members 104. Rotation of the connector member 102 can cause the protrusion member 300 to travel along the second portion 126, and prevent further movement of the connector member 102 along the axis 124 (see FIG. 1). Additionally and/or alternatively, movement of the protrusion member 300 along the second portion 126 can cause further approximation between the coupling members 104 and the connector 102 as discussed herein. In this regard, the sections of the board 1000 can further be approximated as the connector member 102 is rotated with respect to the coupling member 104.

Figure 11E:
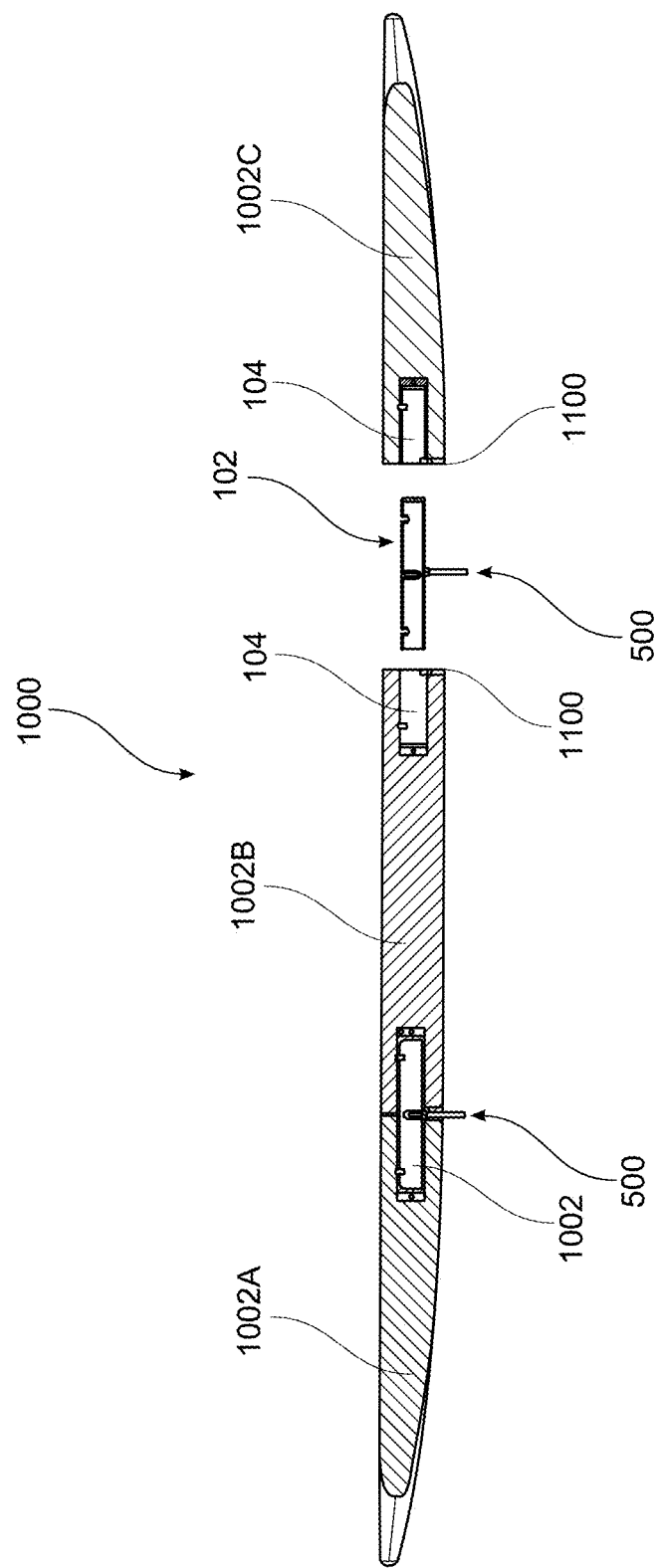

FIG. 11E illustrates a side, cross-sectional view of the board 1000 shown in FIG. 11A. The sections 1002A, 1002B, 1002C can each include one or more coupling members 104. The coupling members 104 can be embedded within the sections 1002A, 1002B, 1002C. The sections 1002A, 1002B, 1002C can each include one or more holes 1006 (see FIG. 11A) that can receive the coupling members 104. The open end of the coupling members 104 can be flush with the surfaces 1008 of the sections 1002A, 1002B, 1002C.

The sections 1002A, 1002B, 1002C can each include a recess 1100 that allows users to insert the actuator member 500 into the connector member 102. For example, when the sections 1002B and 1002C are brought together, the corresponding recesses 1100 can create a space for the actuator member 500. The recesses 1100 can align with the cut-out portions 154 of the coupling members 104. The cut-out portions 154 and the recesses 1100 together generate a space for the actuator member 500 and the connector member 102 to rotate about the central axis 124.

While certain arrangements of the inventions have been described, these arrangements have been presented by way of example only, and are not intended to limit the scope of the disclosure. Indeed, the novel methods and systems described herein may be embodied in a variety of other forms. Furthermore, various omissions, substitutions and changes in the systems and methods described herein may be made without departing from the spirit of the disclosure. The accompanying claims and their equivalents are intended to cover such forms or modifications as would fall within the scope and spirit of the disclosure. Accordingly, the scope of the present inventions is defined only by reference to the appended claims.

LIST OF EXAMPLE NUMBERED EMBODIMENTS

The following is a list of example numbered embodiments. The features recited in the below list of example embodiments can be combined with additional features disclosed herein. Furthermore, additional inventive combinations of features are disclosed herein, which are not specifically recited in the below list of example embodiments and which do not include the same features as the specific embodiments listed below. For sake of brevity, the below list of example embodiments does not identify every inventive aspect of this disclosure. The below list of example embodiments are not intended to identify key features or essential features of any subject matter described herein.

1. A water transport comprising at least first and second sections, said sections comprising mating first and second cross-sectional surfaces and said sections held together at said surfaces by at least one connector system, said system comprising:

a connector member having first and second ends;

a first coupling member embedded in said first foam section;

a second coupling member embedded in said second foam section;

the connector member having walls forming a generally cylindrical connector body having and an inside and outside diameter and a longitudinal central axis;

the coupling members each having a central longitudinal axis and walls forming generally cylindrical coupling bodies each having at least one open end and an inside and outside diameter, said walls having an inner surface and an outer surface;

said at least one open end of the first coupling member being located at the first cross-sectional surface and said at least one open end of the second coupling member being located at the second cross-sectional surface with the axes of the coupling members in alignment;

and wherein an inside diameter of each coupling member body is greater than an outside diameter of the connector member body, so that at least a portion of the first end of the connector member is located into the at least one open end of the first coupling member and at least a portion of the second end of the connector member is located into the at least open end of the second coupling member;

each coupling member having at least one coupling projection extending inwardly from its inner surface;

the first end of the connector member having a first connector channel through the wall of the connector member that is open at said first end and the second end of the connector member having a second connector channel through the wall of the connector member that is open at said second end;

whereby, the at least a portion of the first end of the connector member is located into the at least one open end of the first coupling member and the at least a portion of the second end of the connector member is located into the at least one open end of the second coupling member with the at least one coupling projection of each coupling member engaged with the respective one of the first and second connector channels;

the connector channels being configured such that rotation of the connector member about its axis permits the at least one coupling projection of each coupling member to travel along the respective connector channel to a position where the connector member cannot be withdrawn axially from either coupling member.

2. A water transport according to embodiment 1, wherein the connector system further comprising an actuator member for causing the connector member to rotate about its axis.

3. A water transport according to embodiment 2, wherein the actuator member has an engagement feature and the connector member comprises a fitting on or in the wall of the connector member and configured to receive the engagement feature.

4. A water transport according to embodiment 3, wherein the engagement feature comprises a hole.

5. A water transport according to embodiment 3 or 4, wherein the actuator member comprises a rod having at least one end configured to fit the fitting.

6. A water transport according to any preceding embodiment, wherein the connector channels begin at the at the first and second ends and comprise a first portion extending partially along the connector member generally parallel to the axis and a second portion extending at an angle to the first portion at least partially around the wall of the connector member.

7. A water transport according to embodiment 6, wherein said angle is more than 90 degrees.

8. A water transport according to embodiment 5 or 6, wherein said first portion comprises a beginning section that is wider than the remainder of the first portion.

9. A water transport according to any preceding embodiment, wherein the connector channels are generally L-shaped.

10. A water transport according to any preceding embodiment, wherein each coupling member comprises at least one anchoring projection extending from its outer surface.

11. A water transport according to any preceding embodiment made of foam.

12. A water transport according to embodiment 11, wherein said foam is polyurethane, expanded polystyrene or extruded polystyrene.

13. A water transport according to any preceding embodiment, in the form of a surfboard.

14. A water transport according to any of embodiments 1 to 12, in the form of a paddleboard.

15. A connector system for connecting solid foam products together, said system comprising:
a connector member having first and second ends;
first and second coupling members;
the connector member having walls forming a generally cylindrical connector body having and an inside and outside diameter and a longitudinal central axis;
the coupling members each having walls forming generally cylindrical coupling bodies each having at least one open end and an inside and outside diameter, said walls having an inner surface and an outer surface;
and wherein an inside diameter of each coupling member body is greater than an outside diameter of the connector member body, so that at least a portion of the first end of the connector member can be located into the open end of the first coupling member and at least a portion of the second end of the connector member can be located into the open end of the second coupling member;
each coupling member having at least one coupling projection extending inwardly from its inner surface;
the first end of the connector member having a first connector channel through the wall of the connector member that is open at said first end and the second end of the connector member having a second connector channel through the wall of the connector member that is open at said second end;
whereby, when the at least a portion of the first end of the connector member is located into the open end of the first coupling member and the at least a portion of the second end of the connector member is located into the open end of the second coupling member, each a sufficient distance, the at least one coupling projection of each coupling member engages with the respective one of the first and second connector channels;
the connector channels being configured such that rotation of the connector member about its axis permits the at least one coupling projection of each coupling member to travel along the respective connector channel to a position where the connector member cannot be withdrawn axially from either coupling member.

16. A connector system according to embodiment 14, further comprising an actuator member for causing the connector member to rotate about its axis.

17. A connector system according to embodiment 15, wherein the actuator member has an engagement feature and the connector member comprises a fitting on or in the wall of the connector member and configured to receive the engagement feature.

18. A connector system according to embodiment 16, wherein the engagement feature comprises a hole.

19. A connector system according to embodiment 17, wherein the actuator member comprises a rod having at least one end configured to fit the fitting.

20. A connector system according to any preceding embodiment, wherein the connector channels begin at the at the first and second ends and comprise a first portion extending partially along the connector member generally parallel to the axis and a second portion extending at an angle to the first portion at least partially around the wall of the connector member.

21. A connector system according to embodiment 19, wherein said angle is more than 90 degrees.

22. A connector system according to embodiment 19 or 20, wherein said first portion comprises a beginning section that is wider than the remainder of the first portion.

23. A connector system according to any preceding embodiment, wherein the connector channels are generally L-shaped.

24. A connector system according to any preceding embodiment, wherein each coupling member comprises at least one anchoring projection extending from its outer surface.

25. A surfboard or paddleboard comprising multiple sections, each section being joined to its neighboring section by at least one connector system comprising three generally cylindrically walled, open-ended members aligned on a common axis, with the first and third members located in the board on either side of a join and the second member inside of and bridging each of the first and second members;
the first and third members having at least one internal projection extending into a bent passage in the wall of and at each end of the second member, respectively, along which the at least one internal projection can travel upon rotation of the second member about its longitudinal axis to unlock or lock the sections together.

26. A method of coupling two or more sections of a water transport device, the method comprising performing any of the functions and/or steps associated with the features recited in any one of embodiments 1 to 25.

27. A method of manufacturing a connector assembly, the method comprising manufacturing any of the features recited in any one of embodiments 1 to 25.

28. A method of manufacturing a water transport device, the method comprising manufacturing any of the features recited in any one of embodiments 1 to 25.

Features, materials, characteristics, or groups described in conjunction with a particular aspect, embodiment, or example are to be understood to be applicable to any other aspect, embodiment or example described in this section or elsewhere in this specification unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The protection is not restricted to the details of any foregoing arrangements. The protection extends to any novel one, or any novel combination, of the features disclosed in this specification (including any accompanying claims, abstract and drawings), or to any novel one, or any novel combination, of the steps of any method or process so disclosed.

Furthermore, certain features that are described in this disclosure in the context of separate arrangements can also be implemented in combination in a single arrangement. Conversely, various features that are described in the context of a single arrangement can also be implemented in multiple arrangements separately or in any suitable subcombination. Moreover, although features may be described above as acting in certain combinations, one or more features from a claimed combination can, in some cases, be excised from the combination, and the combination may be claimed as a subcombination or variation of a subcombination.

Moreover, while operations may be depicted in the drawings or described in the specification in a particular order, such operations need not be performed in the particular order shown or in sequential order, or that all operations be performed, to achieve desirable results. Other operations that are not depicted or described can be incorporated in the example methods and processes. For example, one or more additional operations can be performed before, after, simultaneously, or between any of the described operations. Further, the operations may be rearranged or reordered in other arrangements. Those skilled in the art will appreciate that in some arrangements, the actual steps taken in the processes illustrated and/or disclosed may differ from those shown in the figures. Depending on the embodiment, certain of the steps described above may be removed, others may be added. Furthermore, the features and attributes of the specific arrangements disclosed above may be combined in different ways to form additional arrangements, all of which fall within the scope of the present disclosure. Also, the separation of various system components in the arrangements described above should not be understood as requiring such separation in all arrangements, and it should be understood that the described components and systems can generally be integrated together in a single product or packaged into multiple products.

For purposes of this disclosure, certain aspects, advantages, and novel features are described herein. Not necessarily all such advantages may be achieved in accordance with any particular embodiment. Thus, for example, those skilled in the art will recognize that the disclosure may be embodied or carried out in a manner that achieves one advantage or a group of advantages as taught herein without necessarily achieving other advantages as may be taught or suggested herein.

Conditional language, such as "can," "could," "might," or "may," unless specifically stated otherwise, or otherwise understood within the context as used, is generally intended to convey that certain arrangements include, while other arrangements do not include, certain features, elements, and/or steps. Thus, such conditional language is not generally intended to imply that features, elements, and/or steps are in any way required for one or more arrangements or that one or more arrangements necessarily include logic for deciding, with or without user input or prompting, whether these features, elements, and/or steps are included or are to be performed in any particular embodiment.

Language of degree used herein, such as the terms "approximately," "about," "generally," and "substantially" as used herein represent a value, amount, or characteristic close to the stated value, amount, or characteristic that still performs a desired function or achieves a desired result. For example, the terms "approximately", "about", "generally," and "substantially" may refer to an amount that is within less than 10% of, within less than 5% of, within less than 1% of, within less than 0.1% of, and within less than 0.01% of the stated amount. As another example, in certain arrangements, the terms "generally parallel" and "substantially parallel" refer to a value, amount, or characteristic that departs from exactly parallel by less than or equal to 15 degrees, 10 degrees, 5 degrees, 3 degrees, 1 degree, or 0.1 degree.

The scope of the present disclosure is not intended to be limited by the specific disclosures of preferred arrangements in this section or elsewhere in this specification, and may be defined by claims as presented in this section or elsewhere in this specification or as presented in the future. The language of the claims is to be interpreted broadly based on the language employed in the claims and not limited to the examples described in the present specification or during the prosecution of the application, which examples are to be construed as non-exclusive.

What is claimed is:

1. A water board with a connector system for holding together sections of the water board, said water board comprising:
   a first section having a first surface extending between sides of the water board;
   a second section having a second surface extending between sides of the water board; and
   a connector system configured to connect the first and second sections by fixing the first surface to be adjacent the second surface, the connector system comprising:
      a generally cylindrical connector comprising:
         a first end;
         a second end;
         a connector wall having an inner surface and an outer surface, the inner surface of the generally cylindrical connector having an inside diameter, the outer surface of the generally cylindrical connector having an outside diameter, the inside and outside diameters of the connector wall perpendicular to a longitudinal central axis extending between the first and second ends;
         a first connector channel formed in the connector wall at the first end; and
         a second connector channel formed in the connector wall at the second end; and
      a first generally cylindrical coupler embedded in the first section of the water board, the first generally cylindrical coupler comprising:
         a first coupler wall having an inner surface and an outer surface, the inner surface of the first generally cylindrical coupler having an inside diameter, the outer surface of the first generally cylindrical coupler having an outside diameter, the first coupler wall forming a first open end,
wherein the inside diameter of the first coupler wall is greater than the outside diameter of the connector wall such that at least a portion of the connector wall at the first end of the generally cylindrical connector is configured to be positioned into the first open end of the first generally cylindrical coupler; and
a first coupling boss extending inwardly from the inner surface of the first generally cylindrical coupler, the first coupling boss configured to engage with the first connector channel to fix the at least a portion of the connector wall at the first end within the first coupler wall with the first end of the generally cylindrical connector positioned into the first open end of the first generally cylindrical coupler; and
a second generally cylindrical coupler embedded in the second section of the water board, the second generally cylindrical coupler comprising:
a second coupler wall having an inner surface and an outer surface, the inner surface of the second generally cylindrical coupler having an inside diameter, the outer surface of the second generally cylindrical coupler having an outside diameter, the second coupler wall forming a second open end,
wherein the inside diameter of the second coupler wall is greater than the outside diameter of the connector wall such that at least a portion of the connector wall at the second end of the generally cylindrical connector is configured to be positioned into the second open end of the second generally cylindrical coupler; and
a second coupling boss extending inwardly from the inner surface of the second generally cylindrical coupler, the second coupling boss configured to engage with the second connector channel to fix the at least a portion of the connector wall at the second end within the second coupler wall with the second end of the generally cylindrical connector positioned into the second open end of the second generally cylindrical coupler.

2. The water board of claim 1, wherein the generally cylindrical connector further comprises an actuator rod configured to rotate the generally cylindrical connector about the longitudinal central axis.

3. The water board of claim 2, wherein the first and second generally cylindrical coupler each comprises a recessed portion providing space between the first and second generally cylindrical coupler to allow the actuator rod to rotate relative to the longitudinal central axis.

4. The water board of claim 1, wherein the first and second connector channels begin at the at the first and second ends, respectively, and each comprises a first portion extending partially along the connector member generally parallel to the longitudinal central axis and a second portion extending at an angle to the first portion.

5. The water board of claim 4, wherein the angle is greater than 90 degrees.

6. The water board of claim 4, wherein the first portion comprises an expanded section that is wider than a remainder of the first portion.

7. The water board of claim 1, wherein the connector channels are generally L-shaped.

8. The water board of claim 1, wherein the first and second generally cylindrical couplers each comprises a stabilizing member positioned opposite the first and second open ends, wherein the stabilizing member is configured engage the first or second section of the water board to prevent rotation of the first or second generally cylindrical couplers relative to the first or second section of the water board.

9. The water board of claim 8, wherein the stabilizing member comprises at least one anchoring projection extending from the first or second coupler wall.

10. The water board of claim 8, wherein the stabilizing member comprises a flange comprising one or more openings, the flange having an extent greater than the outside diameter of the first or second generally cylindrical coupler.

11. The water board of claim 10, wherein the first or second section of the water board is formed around the flange, and wherein the one or more openings allow portions of the first or second section to extend through the flange to fix the flange relative to the first or second section.

12. A connector system for connecting solid foam products together, said system comprising:
a connector member having first and second ends;
first and second coupling members;
the connector member having walls forming a generally cylindrical connector body having and an inside and outside diameter and a longitudinal central axis;
the coupling members each having walls forming generally cylindrical coupling bodies each having at least one open end and an inside and outside diameter, said walls having an inner surface and an outer surface;
wherein an inside diameter of each coupling member body is greater than an outside diameter of the connector member body, so that at least a portion of the first end of the connector member can be located into the open end of the first coupling member and at least a portion of the second end of the connector member can be located into the open end of the second coupling member;
each coupling member having at least one coupling projection extending inwardly from its inner surface;
the first end of the connector member having a first connector channel through the wall of the connector member that is open at said first end and the second end of the connector member having a second connector channel through the wall of the connector member that is open at said second end;
whereby, when the at least a portion of the first end of the connector member is located into the open end of the first coupling member and the at least a portion of the second end of the connector member is located into the open end of the second coupling member, each a sufficient distance, the at least one coupling projection of each coupling member engages with the respective one of the first and second connector channels;
the connector channels being configured such that rotation of the connector member about its axis permits the at least one coupling projection of each coupling member to travel along the respective connector channel to a position where the connector member cannot be withdrawn axially from either coupling member;
the connector member comprising a fitting configured to receive an actuator member.

13. The connector system of claim 12, further comprising an actuator member for causing the connector member to rotate about its axis.

14. The connector system of claim 12, wherein the connector channels begin at the at the first and second ends and comprise a first portion extending partially along the connector member generally parallel to the axis and a second portion extending at an angle to the first portion at least partially around the wall of the connector member.

15. The connector system of claim 14, wherein the angle is more than 90 degrees.

16. The connector system of claim 14, wherein the first portion comprises a beginning section that is wider than a remainder of the first portion.

17. The connector system of claim 12, wherein the connector channels are generally L-shaped.

18. The connector system of claim 12, wherein each coupling member comprises a stabilizing member, wherein the stabilizing member provides support to prevent rotation of the connector member with respect to each of the coupling members.

19. The water board of claim 4, wherein:
a rotation of the generally cylindrical connector causes the first coupling boss to move along the second portion of the first connector channel; and
the movement of the first coupling boss along the second portion of the first connector channel causes approximation between the first generally cylindrical coupler and the generally cylindrical connector.

20. The connector system of claim 14, wherein:
a rotation of the connector member causes the at least one coupling projection of the first and second coupling members to move along the second portions of the connector channels of the connector member; and
the movement of the at least one coupling projection along the second portions of the connector channels causes approximation between the first and second coupling members and the connector member.

* * * * *